US006292768B1

(12) United States Patent
Chan

(10) Patent No.: US 6,292,768 B1
(45) Date of Patent: *Sep. 18, 2001

(54) METHOD FOR CONVERTING NON-PHONETIC CHARACTERS INTO SURROGATE WORDS FOR INPUTTING INTO A COMPUTER

(76) Inventor: Kun Chun Chan, 6955 Fisk Ave., San Diego, CA (US) 92122

( * ) Notice: Subject to any disclaimer, the term of this patent is extended or adjusted under 35 U.S.C. 154(b) by 0 days.

This patent is subject to a terminal disclaimer.

(21) Appl. No.: 09/297,707

(22) PCT Filed: Dec. 10, 1996

(86) PCT No.: PCT/US96/19780

§ 371 Date: Jul. 20, 1999

§ 102(e) Date: Jul. 20, 1999

(51) Int. Cl.[7] .............................. G06F 17/20; G06F 15/38

(52) U.S. Cl. .................................... 704/1; 704/1; 707/535

(58) Field of Search ................................. 704/1, 8, 9, 10; 707/530, 535; 400/110; 341/22

(56) References Cited

U.S. PATENT DOCUMENTS 4,602,878 * 7/1986 Merner et al. ....................... 400/110
4,698,758 * 10/1987 Larsen ....................................... 704/1
4,829,583 * 5/1989 Monroe et al. ...................... 382/185
4,868,913 * 9/1989 Tse-Kai ............................... 400/110
5,109,352 * 4/1992 O'Dell ................................ 705/542
5,119,296 * 6/1992 Zheng et al. ............................. 704/1
5,131,766 * 7/1992 Wong .................................. 707/535
5,137,383 * 8/1992 Wong .................................. 400/484
5,175,803 * 12/1992 Yeh ..................................... 707/535
5,307,267 * 4/1994 Yang ........................................ 704/9
5,360,343 * 11/1994 Tang ........................................ 704/9
5,903,861 * 5/1999 Chan ........................................ 704/1

* cited by examiner

*Primary Examiner*—Patrick N. Edouard
(74) *Attorney, Agent, or Firm*—Raymond Y. Chan; David and Raymond Patent Group

(57) ABSTRACT

A method for specifically converting non-phonetic characters representing vocabulary in languages into surrogate words for inputting into a computer includes the steps of (a) alphabetizing a pictographic/ideographic radical of each character according to its pronunciation in a respective language, with the resulting spelling then being used as a prefix for a newly created surrogate word; (b) alphabetizing a phonetic radical according to its pronunciation in the respective language with the resulting spelling then being used as a suffix for the newly created surrogate word; and (c) combining the prefix and suffix together and separate them with a separate mark such as a hyphen "-", thus creating the surrogate word for each specific "character" used in the written form of the respective language. Such newly created surrogate words are unique for and can precisely represent the non-phonetic characters used in the written oriental languages such as Chinese, Japanese, Korean language, and Indian language, thus facilitating the easy input of the information in these languages into a computer either manually or orally.

40 Claims, 24 Drawing Sheets

Chart

Illustration of the five steps used to convert the characters into English-style alphabets

| Process/ description | Changes the characters used by the Chinese go through with the five steps of conversion process | | | |
|---|---|---|---|---|
| The original, whole characters having the same pronunciation | 試 Pronounced *shi* in *pin yin* | 誓 Pronounced *shi* in *pin yin* | 言是 Pronounced *shi* in *pin yin* | 識 Pronounced *shi* in *pin yin* |
| Divide into two radicals | 言 Pictographic radica; 式 Phonetic radical | 言 Pictographic radical; 折 Phonetic radical | 言 Pictographic radical; 是 Phonetic radical | 言 Pictographic radical; 戠 Phonetic radical |
| Phoneticalize both raidcals (steps one and two) | *yan* (prefix) *shi* (suffix) | *yan* (prefix) *shi* (suffix) | *yan* (prefix) *shi* (suffix) | *yan* (prefix) *shi* (suffix) |
| Add the indicators of intonation (step three) to each radical (prefix and suffix) | *yan* *shif* The prefix is unique. Intonation indicator is not needed for the prefix. All the four characters are pronounced in the fourth intonation, an *f* is added to the end of the suffixes. | *yan* *shif* | *yan* *shif* | *yan* *shif* |
| Put the prefix and the suffix together (step four) | *yan-shif* The spelling for all four characters are exactly the same. Without adding a "marker," it is impossible to differentiate one from the others. | *yan-shif* | *yan-shif* | *yan-shif* |
| Add markers to the prefix and the suffix (step five) | *yan-shif* No marker is needed for unique prefix. Since this character is the first of the four to appear in the dictionary, it does not require a marker. | *yan-shiff* No marker is needed for the unique prefix. Since this character appears secondly in the dictionary, the last letter is repeated once as a maker. | *yan-shifff* No marker is needed for the unique prefix. Since this character is the third one to appear in the dictionary, the last letter is repeated twice as markers. | *yan-shiffff* No marker is needed for the unique prefix. Since the character appears fourthly in the dictionary, the last letter is repeated thrice as markers. |
| The final product: unique, new "word" for each character | *yan-shif* | *yan-shiff* | *yan-shifff* | *yan-shiffff* |
| Spellings made of *zhuyin zimu* | ㄧㄢ-ㄕㄈ | ㄧㄢ-ㄕㄈㄈ | ㄧㄢ-ㄕㄈㄈㄈ | ㄧㄢ-ㄕㄈㄈㄈㄈ |

Please remember that the markers have no effect in the way the new "words" are pronounced and the first of the two rules: the prefix is silent.

Chart

*Pin yin* alphabets and *zhuyin zimu*

| Serial Number | *Pin yin* alphabets (Consonants | *Zhuyin Zimu* | Serial Number | *Pin Yin* Alphabets (Vowels) | *Zhuyin Zimu* |
|---|---|---|---|---|---|
| 1 | B | ㄅ | 22 | Y, YI, I | ㄧ |
| 2 | P | ㄆ | 23 | W,U | ㄨ |
| 3 | M | ㄇ | 24 | U, YU | ㄩ |
| 4 | F | ㄈ | 25 | A | ㄚ |
| 5 | D | ㄉ | 26 | O | ㄛ |
| 6 | T | ㄊ | 27 | E | ㄜ |
| 7 | L | ㄌ | 28 | AI | ㄞ |
| 8 | N | ㄋ | 29 | EI | ㄟ |
| 9 | G | ㄍ | 30 | AO | ㄠ |
| 10 | K | ㄎ | 31 | OU | ㄡ |
| 11 | H | ㄏ | 32 | AN | ㄢ |
| 12 | J | ㄐ | 33 | EN | ㄣ |
| 13 | Q | ㄑ | 34 | ANG | ㄤ |
| 14 | X | ㄒ | 35 | ENG | ㄥ |
| 15 | ZH | ㄓ | 36 | ER | ㄦ |
| 16 | CH | ㄔ | | | |
| 17 | SH | ㄕ | | | |
| 18 | R | ㄖ | | | |
| 19 | Z | ㄗ | | | |
| 20 | C | ㄘ | | | |
| 21 | S | ㄙ | | | |

Compound Vowels

| | | | | | |
|---|---|---|---|---|---|
| 37 | IA | ㄧㄚ | 48 | WEI, uei | ㄨㄟ |
| 38 | IE | ㄧㄝ | 49 | WAN, uan | ㄨㄢ |
| 39 | IAO | ㄧㄠ | 50 | WEN, uen | ㄨㄣ |
| 40 | IU | ㄧㄡ | 51 | WANG, uang | ㄨㄤ |
| 41 | IAN | ㄧㄢ | 52 | WENG, ong | ㄨㄥ |
| 42 | IN | ㄧㄣ | 53 | YUE | ㄩㄝ |
| 43 | IANG | ㄧㄤ | 54 | YUAN | ㄩㄢ |
| 44 | IONG | ㄩㄥ | 55 | YUEN | ㄩㄣ |
| 45 | WA, ua | ㄨㄚ | | | |
| 46 | WO, uo | ㄨㄛ | | | |
| 47 | WAI, uai | ㄨㄟ | | | |

FIG 1

PRIOR ART

Chart
*Katakana, hiragana* and their English Equivalent

| Serial No. | *Katakana* | *Hiragana* | Eng. Equ. |
|---|---|---|---|
| 1 | ア | あ | A |
| 2 | イ | い | I |
| 3 | ウ | う | U |
| 4 | エ | え | E |
| 5 | オ | お | O |
| 6 | カ | か | KA |
| 7 | キ | き | KI |
| 8 | ク | く | KU |
| 9 | ケ | け | KE |
| 10 | コ | こ | KO |
| 11 | サ | さ | SA |
| 12 | シ | し | SHI |
| 13 | ス | す | SU |
| 14 | セ | せ | SE |
| 15 | ソ | そ | SO |
| 16 | タ | た | TA |
| 17 | チ | ち | CHI |
| 18 | ツ | つ | TSU |
| 19 | テ | て | TE |
| 20 | ト | と | TO |
| 21 | ナ | な | NA |
| 22 | ニ | に | NI |
| 23 | ヌ | ぬ | NU |
| 24 | ネ | ね | NE |
| 25 | ノ | の | NO |
| 26 | ハ | は | HA |
| 27 | ヒ | ひ | HI |
| 28 | フ | ふ | HU/ FU |
| 29 | ヘ | へ | HE |
| 30 | ホ | ほ | HO |
| 31 | マ | ま | MA |
| 32 | ミ | み | MI |
| 33 | ム | む | MU |
| 34 | メ | め | ME |
| 35 | モ | も | MO |
| 36 | ヤ | や | YA |
| 37 | ユ | ゆ | YU |
| 38 | ヨ | よ | YO |
| 39 | ラ | ら | RA |
| 40 | リ | り | RI |
| 41 | ル | る | RU |
| 42 | レ | れ | RE |
| 43 | ロ | ろ | RO |
| 44 | ワ | わ | WA |
| 45 | ヲ | を | O |
| 46 | ン | ん | UN |
| 47 | ガ | が | GA |
| 48 | ギ | ぎ | GI |
| 49 | グ | ぐ | GU |
| 50 | ゲ | げ | GE |
| 51 | ゴ | ご | GO |
| 52 | ザ | ざ | ZA |
| 53 | ジ | じ | JI (ZI) |
| 54 | ズ | ず | ZU |
| 55 | ゼ | ぜ | ZE |
| 56 | ゾ | ぞ | ZO |
| 57 | ダ | だ | DA |
| 58 | ヂ | ぢ | JI (JI) |
| 59 | ヅ | づ | ZU |
| 60 | デ | で | DE |
| 61 | ド | ど | DO |
| 62 | バ | ば | BA |
| 63 | ビ | び | BI |
| 64 | ブ | ぶ | BU |
| 65 | ベ | べ | BE |
| 66 | ボ | ぼ | BO |
| 67 | パ | ぱ | PA |
| 68 | ピ | ぴ | PI |
| 69 | プ | ぷ | PU |
| 70 | ペ | ぺ | PE |
| 71 | ポ | ぽ | PO |

FIG 2
PRIOR ART

Chart
Hangul and Their English Equivalent

| Consonants | English Equivalent | Vowels | English Equivalent |
|---|---|---|---|
| ㄱ | K | ㅏ | A |
| ㄴ | N | ㅑ | YA |
| ㄷ | D (T) | ㅓ | Ō |
| ㄹ | R (L) | ㅕ | YŌ |
| ㅁ | M | ㅗ | O |
| ㅂ | P (B) | ㅛ | YO |
| ㅅ | S | ㅜ | U |
| ㅇ | Ø (NG) | ㅠ | YU |
| ㅈ | CH | ㅡ | Ū |
| ㅊ | CH' | ㅣ | I |
| ㅋ | K' | ㅐ | AE |
| ㅌ | T' | ㅒ | YAE |
| ㅍ | P' | ㅔ | E |
| ㅎ | H | ㅖ | YE |
| ㄲ | KK-K' | ㅢ | ŪI |
| ㄸ | TT | ㅟ | WI (UE) |
| ㅃ | PP | ㅚ | WE (OE) |
| ㅆ | SS-T | ㅘ | WA |
| ㅉ | CC | ㅙ | WAE |
| | | ㅝ | WŪ |
| | | ㅞ | WE |

FIG 3
PRIOR ART

LIST OF RADICALS

| Serial No. | Radicals in original forms and shapes | Literary Pronunciation | Habitual Pronunciation | Special key(s) for computer input | Optional key(s) for input |
|---|---|---|---|---|---|
| 1 | 一 | yi | heng | y | hg ㄏㄥ |
| 2 | 丨 | gunm | shuf | shu ㄕㄨ | gun, zhip ㄓ — |
| 3 | 丶 | zhum | dianm | dia ㄉㄧㄢ | zhum |
| 4 | 丿 | piem | | pie ㄆㄧㄝ | |
| 5 | 乙 | yim | | yim | |
| 6 | 亅 | juep | gou | go ㄍㄡ | ju ㄐㄩㄝ |
| 7 | 二 | erf | | erf ㄦㄈ | err |
| 8 | 亠 | toup | | to ㄊㄡ | |
| 9 | 人 | ren | | r ㄖ | |
| 10 | 儿 | erp | | erp ㄦㄆ | ee ㄦㄦ |
| 11 | 入 | ruf | | ru ㄖㄨ | |
| 12 | 八 | ba | | ba ㄅㄚ | |
| 13 | 冂 | jiong | | jio ㄐㄧㄥ | jg |
| 14 | 冖 | mif | | mif ㄇㄧㄈ | |
| 15 | 冫 | bing | | bin ㄅㄧㄥ | bn |
| 16 | 几 | ji | | ji ㄐㄧ | |
| 17 | 凵 | qu | qu | qu ㄑㄩ | |
| 18 | 刀 | dao | | d ㄉ | |
| 19 | 力 | lif | | l ㄌ | |
| 20 | 勹 | bao | bo | bao ㄅㄠ | bo |

FIG 4A

LIST OF RADICALS

| Serial No. | Radicals in original forms | Literary Pronunciation | Habitual pronunciation | Key(s) for computer input | Optioanl key(s) for input |
|---|---|---|---|---|---|
| 21 | 匕 | bif | | bi ㄅㄧ | |
| 22 | 匚 | fang | | fang ㄈㄤ | fng |
| 23 | 匸 | xif | | xif ㄒㄧㄈ | |
| 24 | 十 | ship | | ship ㄕㄆ | shhhh, shii |
| 25 | 卜 | bum | | bu ㄅㄨ | bw, pw puu |
| 26 | 卩 | jiep | | jie ㄐㄧㄝ | je ㄐㄝ |
| 27 | 厂 | hanm | changm, he | cha ㄏ | cg, he |
| 28 | 厶 | si | | sii ㄙ | |
| 29 | 又 | youf | | you ㄧㄡ | |
| 30 | 凵 | koum | | k ㄎ | |
| 31 | 囗 | weip | | w ㄨ | |
| 32 | 土 | tum | | t ㄊ | |
| 33 | 士 | shif | | shif ㄕㄈ | shf |
| 34 | 夂 | zhim | | zhim ㄓㄇ | zii ㄓㄓ |
| 35 | 夊 | sui | | sui ㄙㄨㄟ | |
| 36 | 夕 | xiff | | xiff ㄒㄧㄈㄈ | |
| 37 | 大 | daf | | da ㄉㄚ | |
| 38 | 女 | num | | nu ㄋㄩ | nn ㄋㄋ |
| 39 | 子 | zim | | zi ㄗ | |
| 40 | 宀 | mianp | bao-zi/bao-gai | mi ㄇㄧㄢ, ㄇㄧ | bg, bz ㄅㄍ, ㄅㄗ |
| 41 | 寸 | cunf | | cu ㄘㄨ | |

FIG 4B

LIST OF RADICALS

| Serial No. | Radicals in original form and shape | Literary Pronunciation | Habitual Pronunciation | Special key(s) for computer input | Optional keys for input |
|---|---|---|---|---|---|
| 42 | 小 | xiaom | | xia ㄒㄧㄠ | |
| 43 | 尢 | wang | ang | an 尢 | wn |
| 44 | 尸 | shi | | shi 尸 | |
| 45 | 屮 | chef | | chef ㄔㄜㄈ | ㄔㄜㄜ |
| 46 | 山 | shan | | sha ㄕㄢ | sn |
| 47 | 巛 | chuan | | chua ㄔㄨㄢ | chn |
| 48 | 工 | gong | | gn ㄍㄨㄥ | ㄍㄍㄍㄍ |
| 49 | 己 | jim | | jim ㄐㄧㄇ | |
| 50 | 巾 | jin | | jin ㄐㄧㄣ | jj |
| 51 | 干 | gan | ganf | ga ㄍㄢ | |
| 52 | 幺 | yao | ao | yao ㄧㄠ | ao ㄠ |
| 53 | 广 | yanm | guangm | guan | gg, gwan, ㄧㄢ yn |
| 54 | 廴 | yinm | yanp/tinm | yinm ㄧㄣㄇ | yn |
| 55 | 廾 | gongm | | gon ㄍㄨㄥㄇ | ggg ㄍㄍㄍ |
| 56 | 弋 | yif | | yif ㄧㄈ | |
| 57 | 弓 | gongg | | g ㄍ | |
| 58 | 彐 | jif | xuep | jif ㄐㄧㄈ | xuep ㄒㄩㄝㄆ |
| 59 | 彡 | shann | | shan ㄕㄢㄢ | snn, Shn |
| 60 | 彳 | chi | shuang ren | chi 彳 | rr/sr |

FIG 4C

LIST OF RADICALS

| Serial No. | Radicals in original forms | Literary pronunciation | Habitual pronunciation | Key(s) for computer input | Optional key(s) for computer input |
|---|---|---|---|---|---|
| 61 | 忄心 | xin | | x ㄒ | |
| 62 | 戈 | ge | | ge ㄍㄜ | |
| 63 | 户 | huf | | huf ㄏㄨㄈ | huu/hf |
| 64 | 手 | shoum | | sho ㄕㄡ/ㄕㄕ | ss/ a |
| 65 | 支 | zhi | | zh ㄓ ㄓ | |
| 66 | 攴(攵) | pu | | pu ㄆㄨ | FW |
| 67 | 文 | wenp | | we ㄨㄣ | ww ㄨㄨ |
| 68 | 斗 | doum | douf | doum ㄉㄡㄇ | dm ㄉㄇ |
| 69 | 斤 | jinn | | jinn ㄐㄧㄣㄣ | jnn, jjj ㄐㄐㄐ |
| 70 | 方 | fangg | | fan ㄈㄤㄤ | fg |
| 71 | 无 | wup | | wu ㄨㄨㄨ | |
| 72 | 日 | rif | | ri ㄖㄖ | rrr |
| 73 | 曰 | yuef | | yuef ㄩ/ㄝㄈ | |
| 74 | 月 | yueff | | yue ㄩ/ㄝ | |
| 75 | 木 | muf | | m ㄇ | |
| 76 | 欠 | qianf | | qia ㄑㄧㄢ | ㄑㄢ |
| 77 | 止 | zhimm | | zz ㄓㄇㄇ | |
| 78 | 歹 | daim | | dai ㄉㄞ | dd ㄉㄉ |
| 79 | 殳 | shuff | yif | yif ㄕㄨㄈ | su/ yf |

FIG 4D

LIST OF RADICALS

| Serial No. | Radicals in original forms | Literary pronunciation | Habitual pronunciation | Key(s) for computer input | Optional key(s) for computer input |
|---|---|---|---|---|---|
| 80 | 毋(母) | wum | mum | wum ㄨㄇ | wuu ㄇㄨ |
| 81 | 比 | bimm | | bii ㄅㄧㄇ | |
| 82 | 毛 | maop | | maop ㄇㄠㄆ | mo |
| 83 | 氏 | shiff | | shiff ㄕㄈㄈ | shff |
| 84 | 气 | qif | | qi ㄑㄧ | |
| 85 | 水 | shuim | | s ㄕㄟ | ㄕㄕ |
| 86 | 火 | huom | | h ㄏㄏ | |
| 87 | 爪 | zhaom | | zha ㄓㄠ | zm |
| 88 | 父 | fuf | | fu ㄈㄨ | ff ㄈㄈ |
| 89 | 爻 | yaop | aop | aop/ ao ㄧㄠ | yop, yp |
| 90 | 爿 | qiangp | | qian ㄑㄧㄤ | qg ㄑㄤ |
| 91 | 片 | pianf | | pia ㄆㄧㄢ | pn ㄆㄢ |
| 92 | 牙 | yap | | yap | yaa |
| 93 | 牛 | niup | | ni ㄋㄧ | ㄋㄧㄡ |
| 94 | 犬 | quanm | | q ㄑ | |
| 95 | 玄 | xuanp | | xua ㄩㄢ | xp |
| 96 | 玉 | yuf | | yu ㄩㄈ | |
| 97 | 瓜 | gua | gwa | gua ㄍㄨㄚ | gwa ㄍㄚ |
| 98 | 瓦 | wam | | wa ㄨㄚ | |
| 99 | 甘 | gann | | gan ㄍㄢㄢ | |

FIG 4E

LIST OF RADICALS

| Serial No. | Radicals In Original Forms and Shapes | Literary Pronuciation | HabitualPronunciation | Special Key(s) for Computer Imput | Optional Keys for Input |
|---|---|---|---|---|---|
| 100 | 生 | sheng | | she ㄕㄥ | sg |
| 101 | 用 | yongf | | yo ㄩㄥ | |
| 102 | 田 | tianp | | tia ㄊㄧㄢ | tn ㄊㄢ, ㄊㄊ, ㄊㄊ |
| 103 | 疋 | pip | | pi ㄆㄧ | pp |
| 104 | 疒 | chuangf | bingf | b ㄅ | chu ㄔㄨㄤ |
| 105 | 癶 | boo | guif/ gweif | boo ㄅㄛ | gf ㄈㄚ fa gwei gUEI |
| 106 | 白 | baip | | bai ㄅㄞ | |
| 107 | 皮 | pipp | | p ㄆ | |
| 108 | 皿 | minm | | min ㄇㄧㄣ | mmm |
| 109 | 目 | muff | | mu ㄇㄇ | mm |
| 110 | 矛 | maopp | | maopp ㄇㄠㄆㄆ | mp/ moo/ mou |
| 111 | 矢 | shim | | shim ㄕㄇ | shm |
| 112 | 石 | shipp | | shipp ㄕㄆㄆ | sp |
| 113 | 示 | shifff | qip | sh ㄕㄈㄈ | sf |
| 114 | 禸 | roup | | rou ㄖㄡㄡ | |
| 115 | 禾 | hep | | hep ㄏㄜ | hp, hh ㄏㄏ |
| 116 | 穴 | xuef | | xu ㄒㄩㄝ | xx ㄒㄝ |
| 117 | 立 | liff | | ll ㄌㄌ | lii, lif |
| 118 | 竹 | zhup | | z ㄓㄨ | |
| 119 | 米 | mim | | mii | mmmmm |

FIG 4F

LIST OF RADICALS

| Serial No. | Radicals in original forms | Literary pro-nunciat | Habitual pro-nunciation | key(s) for computer input | Optional key(s) for computer input |
|---|---|---|---|---|---|
| 120 | 糸 | xifff | si | xi ㄒㄈㄈㄈ | si, sss ㄙㄙ |
| 121 | 缶 | foum | | fo ㄈㄡ | |
| 122 | 网 | wangm | | wan ㄨㄤ | wm/ wg |
| 123 | 羊 | yangp | | yg ㄧㄤ | YAN |
| 124 | 羽 | yum | | yum ㄩㄇ | |
| 125 | 老 | laom | | la ㄌㄠ | |
| 126 | 而 | erpp | | eee ㄦㄝㄝ | erpp ㄦㄦㄦ |
| 127 | 耒 | leim | laip | le ㄌㄟ | lai |
| 128 | 耳 | erm | | e ㄦ | ㄦㄇ |
| 129 | 聿 | yuff | lyuf | ly ㄩㄈㄈ, ㄌㄩ | yuuu/yuff |
| 130 | 肉 | rouf | | ro ㄖㄡ | rrr ㄖㄖㄖ |
| 131 | 臣 | chenp | | chen ㄔㄣ | cp |
| 132 | 自 | zif | | zif ㄗㄈ | zf |
| 133 | 至 | zhif | | zhif ㄓㄈ | zzz |
| 134 | 臼 | jiuf | | jiu ㄐㄧㄡ | jf ㄐㄡ |
| 135 | 舌 | shep | | shep ㄕㄜ | shee |
| 136 | 舛 | chuanm | | chuan ㄔㄨㄢㄇ | ㄔㄨㄢ, ㄔㄇ |
| 137 | 舟 | zhou | | zho ㄓㄡ | |
| 138 | 艮 | genf | | gen ㄍㄣ | |
| 139 | 色 | sef | | se ㄙㄜ | |

FIG 4G

LIST OF RADICALS

| Serial No. | Radicals In Original Form and Shapes | Literary Pronunciation | Habitual Pronunciation | Special Key(s) for Computer Input | Optional Key(s) for Input |
|---|---|---|---|---|---|
| 140 | 艸(艹) | caom | | c ㄘ | |
| 141 | 虍 | hup | fup | hu ㄏㄨ | fff/fuu |
| 142 | 虫 | chongp | | ch ㄔㄨㄥ | cc/ v ㄔㄥ |
| 143 | 血 | xuem | | xue ㄒㄩㄝㄝ | xuu ㄒㄝㄝ |
| 144 | 行 | xiongp | hang | xio ㄒ· ㄥ | han, xg |
| 145 | 衣 | yii | | yi ㄧ ㄧ | yy |
| 146 | 襾 | xi | | xii ㄒㄧㄧ | |
| 147 | 見 | jianf | gin | jian ㄐㄧㄢ | ㄐㄢ |
| 148 | 角 | jiao | | jiao ㄐㄧㄠ | jo ㄐㄠ |
| 149 | 言 | yanp | | ya ㄧㄢㄢ | |
| 150 | 谷 | gum | | gu ㄍㄨ | gw |
| 151 | 豆 | douf | | do ㄉㄡㄈ | ㄉㄈ |
| 152 | 豕 | shimm | | shimm ㄕㄇㄇ | |
| 153 | 豸 | zhiff | baof/ mao | mao ㄇㄠ, ㄅㄠㄈ | zhiff ㄓㄈㄈ |
| 154 | 貝 | beif | | be ㄅㄟ | bb ㄅㄈ |
| 155 | 赤 | chif | | chif ㄔㄈ | chf |
| 156 | 走 | zoum | zum | zo ㄗㄡ | zum |
| 157 | 足 | zup | | zu ㄗㄨ | |
| 158 | 身 | shengg | | shen ㄕㄥㄥ | shn, sgg |
| 159 | 車 | che | | che ㄔㄜ | u ㄔㄔ |

FIG 4H

LIST OF RADICALS

| Serial No. | Radicals inoriginal forms | Literary pro-nunciation | Habitual pro-nunciation | Key(s) for computer input | Optional key(s) for computer input |
|---|---|---|---|---|---|
| 160 | 辛 | xinn | | xin ㄒㄧㄣ | xn ㄒㄣ |
| 161 | 辰 | chenpp | | cn ㄔㄣㄣ | |
| 162 | 辵(辶) | chuof | 辵 辶 ZZH | cho ㄔㄨㄛ | zou/ o ㄔㄛ ZZH |
| 163 | 邑(左阝) | yiii | | yii ㄧㄧㄧ | yyy |
| 164 | 酉 | youm | | you ㄡㄡ | ym ㄧㄡㄇ |
| 165 | 采 | caim | | ca ㄘㄞ | ci |
| 166 | 里 | lim | | lll ㄌㄌㄌ | ㄌㄇ, LM |
| 167 | 金 | jinnn | | j ㄐ | |
| 168 | 長 | changp | | chp ㄔㄤ | chan |
| 169 | 門 | menp | | mn ㄇㄣ | ㄇㄇㄇ |
| 170 | 阜(右阝) | fuff | | f ㄈ | ㄦㄈ |
| 171 | 隶 | daif | | daif ㄉㄞㄈ | di |
| 172 | 隹 | jia | | jia ㄐㄧㄚ | ja ㄐㄚ ㄓㄨㄟ ZHU |
| 173 | 雨 | yumm | | yumm ㄩㄇㄇ | ymm |
| 174 | 青 | qing | | qing ㄑㄧㄥ | qn ㄑㄥ |
| 175 | 非 | fei | | fe ㄈㄟ | |
| 176 | 面 | mianf | | mian ㄇㄧㄢㄈ | mf ㄇㄢ |
| 177 | 革 | gep | | gep ㄍㄜㄈ | gp ㄍㄜㄆ |
| 178 | 韋 | weim | | wei ㄨㄟ | wi |
| 179 | 韭 | jium | | jium ㄐㄧㄡㄇ | jm ㄐㄡㄇ |

FIG 4I

LIST OF RADICALS

| Serial no. | Radicals in original forms | literary pronunciation | Habitual pronunciation | Key(s) for computer input | Optional key(s) for input |
|---|---|---|---|---|---|
| 180 | 音 | yin | | yin ㄧㄣ | |
| 181 | 頁 | yef | | ye ㄧㄝ | |
| 182 | 風 | feng | | fen ㄈㄥ | fn |
| 183 | 飛 | feii | | feii ㄈㄟㄟ | fi |
| 184 | 食 | shippp | | shp ㄕㄆㄆㄆ | shhh |
| 185 | 首 | shoumm | | shou ㄕㄡㄡ | su ㄕㄨㄇ |
| 186 | 香 | xiang | | xian ㄒㄧㄤ | xg ㄒㄤ |
| 187 | 馬 | mam | | ma ㄇㄚ | |
| 188 | 骨 | gumm | | gum ㄍㄨㄇ | gwm/gm ㄍㄍㄨ |
| 189 | 高 | gao | | gao ㄍㄠ | |
| 190 | 髟 | biao | | bia ㄅㄧㄠ | |
| 191 | 鬥 | douff | | douf ㄉㄡㄈㄈ | df ㄉㄈㄈ, ㄉㄉㄉ |
| 192 | 鬯 | changf | | chf ㄔㄤㄈ | cf ㄔㄤ |
| 193 | 鬲 | lifff | | llll ㄌㄌㄌㄌ | lf ㄌㄈㄈㄈ |
| 194 | 鬼 | guim | | guip ㄍㄨㄟ | gweip/gp ㄍㄟ |
| 195 | 魚 | yup | | yp ㄩㄆ | |
| 196 | 鳥 | niaom | | n ㄋ | |
| 197 | 鹵 | lum | lwm | lum ㄌㄨㄇ | lm |
| 198 | 鹿 | luf | lwf | lu ㄌㄨ | lw ㄌㄈ |
| 199 | 麥 | maif | | mai ㄇㄞ | |

FIG 4J

LIST OF RADICALS

| Serial No. | Radicals In Original Forms and Shapes | Literary Pronunciation | Habitual Pronunciation | Special Key(s) for Computer Input | Optional Key(s) for Input |
|---|---|---|---|---|---|
| 200 | 麻 | map | | map ㄇㄚㄆ | maa ㄇㄆ |
| 201 | 黃 | huangp | | hua ㄏㄨㄤ | hwa/ hg ㄏㄤ |
| 202 | 黍 | shum | | shum ㄕㄨㄇ | sm ㄕㄨㄨ |
| 203 | 黑 | hei | | hei ㄏㄟ | |
| 204 | 黹 | zhimmm | | zhimm ㄓㄇㄇㄇ | zhmm |
| 205 | 黽 | minmm | | minm ㄇㄧㄣㄇ | ㄇㄧㄣㄣ |
| 206 | 鼎 | dingm | | ding ㄉㄧㄥ | dg ㄉㄥ |
| 207 | 鼓 | gummm | | gumm ㄍㄨㄇㄇ | gwmm, gm ㄍㄨㄨㄨ |
| 208 | 鼠 | shumm | | shumm ㄕㄨㄇㄇ | shuu ㄕㄨ |
| 209 | 鼻 | bip | | bip ㄅㄧㄆ | bp ㄅㄆ |
| 210 | 齊 | qip | | qip ㄑㄧ | qp ㄑㄆ |
| 211 | 齒 | chim | | chim ㄔㄇ | chm |
| 212 | 龍 | long | | lo ㄌㄨㄥ | lg |
| 213 | 龜 | gui | | gui ㄍㄨㄟㄟ | gwei, gi ㄍㄟㄟ |
| 214 | 龠 | yuefff | | yueff ㄩㄝㄈ | yf |

FIG 4K

List Of Chinese Characters Pronounced As "Ji" But Differentiated By Adding To Them Silent Pictographic Radicals To The Left Of Hyphen. These Radicals Expressed By Alphabets Are Referred To As Prefixes.

| | | |
|---|---|---|
| 隮 fu-ji | 屐 shi-ji | 銈 jin-ji |
| 疾 chuang-ji /bing-ji | 伋 ren-ji | 狤 quan-ji |
| 岌 shan-ji | 藉 cao-ji | 脊 rou-ji |
| 擊 shou-ji | 集 jia-ji | 寂 mian-ji |
| 即 zi-ji | 嫉 nyu-ji | 機 mu-ji |
| 鞿 ge-ji | 急 xin-ji | 輯 che-ji |
| 鸄 niao-ji | 瞡 muf-ji | 鰿 yup-ji |
| 齌 qi-ji | 霵 yum-ji | 禨 shif-ji |
| 毄 shu-ji | 剞 dao-ji | 虮 chung-ji |
| 幾 ge-ji | 奇 da-ji | 羈 wang-ji |
| 磯 ship-ji | 璣 yuf-ji | 犄 niu-ji |
| 皀 bai-ji | 髻 biao-ji | 覬 jian-ji |
| 乩 yi-ji | 譏 yan-ji | 嘰 kou-ji |
| 汙 bi-ji | 跡 zu-ji | 箕 zhu-ji |
| 激 shui-ji | 勣 li-ji | 基 tu-ji |
| 績 xi-ji | 積 he-ji | 既 wu-ji |
| 觭 jiao-ji | 庋 yanm-ji | 驥 ma-ji |
| 吉 shif-ji | 耤 lei-ji | 魕 gui-ji |
| 殛 dai-ji | 墼 shu-ji | 尖 xiao-ji |
| 麂 lu-ji | 己 ji | |
| 棘 yy-ji | | |
| | | |
| | | |
| | | |
| | | |
| | | |

FIG 5

Chart

Illustration of the five steps used to convert the characters into English-style alphabets

| Process/ descrption | Changes the characters used by the Chinese go through with the five steps of conversion process | | | |
|---|---|---|---|---|
| The original, whole characters having the same pronunciation | 試<br>Pronounced *shi* in *pin yin* | 誓<br>Pronounced *shi* in *pin yin* | 言是<br>Pronounced *shi* in *pin yin* | 識<br>Pronounced *shi* in *pin yin* |
| Divide into two radicals | 言 Pictographic radica<br>式 Phonetic radical | 言 Pictographic radical<br>折 Phonetic radical | 言 Pictographic radical<br>是 Phonetic radical | 言 Pictographic radical<br>戠 Phonetic radical |
| Phoneticalize both raidcals (steps one and two) | *yan* (prefix)<br>*shi* (suffix) | *yan* (prefix)<br>*shi* (suffix) | *yan* (prefix)<br>*shi* (suffix) | *yan* (prefix)<br>*shi* (suffix) |
| Add the indicators of intonation (step three) to each radical (prefix and suffix) | *yan* *shif*<br>The prefix is unique. Intonation indicator is not needed for the prefix. All the four characters are pronounced in the fourth intonation, an *f* is added to the end of the suffixes. | *yan* *shif* | *yan* *shif* | *yan* *shif* |
| Put the prefix and the suffix together (step four) | *yan-shif*<br>The spelling for all four characters are exactly the same. Without adding a "marker," it is impossible to differentiate one from the others. | *yan-shif* | *yan-shif* | *yan-shif* |
| Add markers to the prefix and the suffix (step five) | *yan-shif*<br>No marker is needed for unique prefix. Since this character is the first of the four to appear in the dictionary, it does not require a marker. | *yan-shiff*<br>No marker is needed for the unique prefix. Since this character appears secondly in the dictionary, the last letter is repeated once as a maker. | *yan-shifff*<br>No marker is needed for the unique prefix. Since this character is the third one to appear in the dictionary, the last letter is repeated twice as markers. | *yan-shiffff*<br>No marker is needed for the unique prefix Since the character appears fourthly in the dictionary, the last letter is repeated thrice as markers. |
| The final product: unique, new "word" for each character | *yan-shif* | *yan-shiff* | *yan-shifff* | *yan-shiffff* |
| Spellings made of *zhuyin zimu* | ㄧㄢ-ㄕㄈ | ㄧㄢ-ㄕㄈㄈ | ㄧㄢ-ㄕㄈㄈㄈ | ㄧㄢ-ㄕㄈㄈㄈㄈ |

Please remember that the markers have no effect in the way the new "words" are pronounced and the first of the two rules: the prefix is silent.

FIG 6

Chart

| Process/ description | Changes the characters used by the Japanese go through with the five steps of conversion process | | | |
|---|---|---|---|---|
| The original, whole characters having the same pronunciation | 杠<br>Pronounced *ko* in Japnese | 杞<br>Pronounced *ko* in Japanese | 杭<br>Pronounced *ko* in Japanese | 枯<br>Pronounced *ko* in Japanese |
| Divide into two radicals | 木 Pictographic radica<br>工 Phonetic radical | 木 Pictographic radical<br>己 Phonetic radical | 木 Pictographic radical<br>亢 Phonetic radical | 木 Pictographic radical<br>古 Phonetic radical |
| Phoneticalize both raidcals (steps one and two) | *ki* (prefix)<br>*ko* (suffix) | *ki* (prefix)<br>*ko* (suffix) | *ki* (prefix)<br>*ko* (suffix) | *ki* (prefix)<br>*ko* (suffix) |
| Add the indicators of intonation (step three) to each radical | **This step is not applicable to Japanese language** | | | |
| Put the prefix and the suffix together (step four) | *ki-ko*<br>The spelling for all four characters are exactly the same. Without a "marker," it is impossible to differenti-ate one form the others. | *ki-ko* | *ki-ko* | *ki-ko* |
| Add markers to the prefix and the suffix (step five) | *ki-ko*<br>The prefix is unique hence no marker is needed for it and since this character is the first of the four to appear in the dictionary, it does not require a marker. | *ki-koo*<br>No marker is needed for the unique prefix. Since this character appears secondly in the dictionary, the last letter is repeated once as a maker. | *ki-kooo*<br>No marker is needed for the unique prefix. Since this character is the third one to appear in the dictionary, the last letter is repeated twice as markers. | *ki-koooo*<br>No marker is needed for the unique prefix. Since the character appears fourthly in the dictionary, the last letter is repeated thrice as markers. |
| The final product: a unique, new "word" for each character | *ki-ko* | *ki-koo* | *ki-kooo* | *ki-koooo* |
| Spellings in *katakana* | キコ | キココ | キコココ | キココココ |
| Spellings in *hiragana* | きこ | きここ | きこここ | きここここ |

Please remember that the markers have no effect on the way the new "words" are pronounced and the first of the two rules: the prefix is silent

FIG 7

Chart

Illustration of the five steps used to convert the characters into English-style alphabets

| Process/ description | Changes the characters used by the Koreans go through with the five steps of conversion process | | | |
|---|---|---|---|---|
| The original, whole characters having the same pronunciation | 杞<br>Pronounced *ki* in Korean | 枝<br>Pronounced *ki* in Korean | 棋<br>Pronounced *ki* in Korean | 機<br>Pronounced *ki* in Korean |
| Divide into two radicals | 木 Pictographic radical<br>己 Phonetic radical | 木 Pictographic radical<br>支 Phonetic radical | 木 Pictographic radical<br>其 Phonetic radical | 木 Pictographic radical<br>幾 Phonetic radical |
| Phoneticalize both raidcals **(steps one and two)** | *muk* (prefix) *ki* (suffix)<br>There are 2 ways to spell the prefix. One is to spell it according to the pronunciation of a native Korean vocabulary. The other | *muk* (prefix) *ki* (suffix)<br>way is to spell it accord -ing to the Korean pronunciation of the Chinese character. Since the patent concerns Chinese | *muk* (prefix) *ki* (suffix)<br>characters, the writer chooses the latter way of spelling. The same choice is made with hangul spelling. This is not to say that it should | *muk* (prefix) *ki* (suffix)<br>not be done with the former way of spelling the vocabulary. It all depends on what the Koreans feel comfort-able with. |
| Add the indicators of intonation **(step three)** to each radical (prefix and suffix) | **This step is not applicable to Korean language** | | | |
| Put the prefix and the suffix together (step four) | *muk-ki*<br>The spelling for all four characters are **exactly** the same. Without adding a "marker," it is impossible to differentiate one form the others. | *muk-kii* | *muk-kiii* | *muk-kiiii* |
| Add markers to the prefix and the suffix (step five) | *muk-ki*<br>No marker is needed for the unique prefix. Since this character is the first of the four to appear in the dictionary, it does not require a marker. | *muk-kii*<br>No marker is needed for the unique prefix. Since this character appears secondly in the dictionary, the last letter is repeated once as a maker. | *muk-kiii*<br>No marker is needed for the unique prefix. Since this character is the third one to appear in the dictionary, the last letter is repeated twice as markers. | *muk-kiiii*<br>No marker is needed for the unique prefix. Since the character appears fourthly in the dictionary, the last letter is repeated thrice as markers. |
| The final product: a unique, new "word" for each character | *muk-ki* | *muk-kii* | *muk-kiii* | *muk-kiiii* |
| Spellings in *hangul* | 묵기 | 묵기ㅣ | 묵기ㅣㅣ | 묵기ㅣㅣㅣ |
| Spellings in hangul |  | | | |

Please remember that the markers have no effect on the way the new "words" are pronounced and first of the two rules: the prefix is silent.

FIG 8

Chart

Changes made to the alphabets used in the *pin yin* system

| Serial Nunmber Of The Alphabet | Original Form In The *Pin Yin* System | Form In *Zhu Yin* | New Form |
|---|---|---|---|
| 22 | I or Yi | ㄧ | Y |
| 24 | U or Yu | ㄩ | Yu |

FIG 9

Chart Showing The Process During which A Unique Set of Codes for Phraese in Chinese Characters Used By The Chinese Are Created

| Row No. | Column No.1 | Column No. 2 | Column No. 3 | Column No. 4 | Column No. 5 | Column No. 6 |
|---|---|---|---|---|---|---|
| 1 | Phrases in Chiese Chrarcters | Spelling in *Pinyin* System | Acronyms according to *Pinyin* System | Spelling according to the process Discussed in Provisioal Patent Application No. | Add Labels/ markers to the Acronym -s in column 3 | New, Unique Set of Codes for the phrases |
| 2 | 幻化 | huan hua | HH | aop-huanf r-huaf | ar | HHar |
| 3 | 火花 | huo hua | HH | h-huom c-hua | hc | HHhc |
| 4 | 火化 | huo hua | HH | h-huom-huaf | hh | HHhh |
| 5 | 花 卉 | hua hui | HH | c-hua ship-huif | cs | HHcs |
| 6 | 謊話 | huang hua | HH | c-huangm yanp-huaf | cy | HHcy |
| 7 | 劃畫 | hua hua | HH | d-huaf tian-huaf | dt | HHdt |
| 8 | 黑 河 | hei he | HH | h-hei s-he | hs | HHhs |
| 9 | 黑話 | hei hua | HH | h-hei yanp-huaf | hy | HHhy |
| 10 | 歡呼 | huan hu | HH | qian-huan k-hu | qk | HHqk |
| 11 | 呼喊 | hu han | HH | k-hu k-hanm | kk | HHkk |
| 12 | 呼號 | hu hau | HH | k-hu k-haup | kk*k* | HHkk*k* |
| 13 | 呼喝 | hu he | HH | k-hu k-he | kk*kk* | HHkk*kk* |
| 14 | 嘿嘿 | hei hei | HH | k-hei k-hei | kk*kkk* | HHkk*kkk* |
| 15 | 回火 | hui huo | HH | wei-huip h-huom | wh | HHwh |
| 16 | 呼喚 | hu huan | HH | k-hu k-huanf | kku | HHkku |
| 17 | 好好 | hau hau | HH | nyu-haum nyu-haum | nn | HHnn |
| 18 | 棄邪歸正 | qi xie gui zheng | QXGZ | m-qif yyy-xiep zhif-gui zhif-zhengf | | QXGZ |
| 19 | 奇形怪狀 | qi xing guai zhuang | QXGZ | daf-qi shann-xing x-guif qiang-zhuangf | *z* | QXGZ*z* |
| 20 | 欺君 罔上 | qi jun wang shang | QJWS | qianf-qi k-jun wang-wang y-shangf | | QJWS |
| 21 | 起居無時 | qi jyu wu shi | QJWS | zu-qim shi-jyu h-wu ri-ship | *s* | QJWS*s* |

Note: The dark, italic letters in clumns 5 and 6 are repeatedly typed as markers.

FIG 10

Chart Showing The Process Through Which A Unique Set Of Codes For Phrases In Chinese Characters Used By The Chinese Is Achieved

| Row No. | Column No.1 | Column No. 2 | Column No. 3 | Column No. 4 | Column No. 5 | Column No. 6 |
|---|---|---|---|---|---|---|
| 1 | Phrases in Chiese Chrarcters | Spelling in *zhuyin* System | Acronyms according to *zhuyin* System | Spelling according to the Process Discussed in Provisional Patent Application No. | Add Labels/ markers to the Acronym-s in column 3 | New, Unique Set of Codes for the phrases |
| 2 | 幻化 | ㄏㄨㄢㄏㄨㄚ | ㄏㄏ | ㄠ*ㄏㄨㄢ ㄖㄣ*ㄏㄨㄚ | ㄠㄖ | ㄏㄏㄠㄖ |
| 3 | 火花 | ㄏㄨㄛ ㄏㄨㄚ | ㄏㄏ | ㄏ*ㄏㄨㄛ ㄘ*ㄏㄨㄚ | ㄏㄘ | ㄏㄏㄏㄘ |
| 4 | 火化 | ㄏㄨㄛ ㄏㄨㄚ | ㄏㄏ | ㄏ*ㄏㄨㄛ ㄖㄣ*ㄏㄨㄚ | ㄏㄖ | ㄏㄏㄏㄖ |
| 5 | 花卉 | ㄏㄨㄚㄏㄨㄟ | ㄏㄏ | ㄘ*ㄏㄨㄚ ㄕㄆ*ㄏㄨㄟ | ㄘㄕ | ㄏㄏㄘㄕ |
| 6 | 謊話 | ㄏㄨㄤㄏㄨㄚ | ㄏㄏ | ㄧㄢ*ㄏㄨㄤ<br>ㄧㄢ*ㄏㄨㄚ | ㄧㄧ | ㄏㄏㄧㄧ |
| 7 | 劃畫 | ㄏㄨㄚㄏㄨㄚ | ㄏㄏ | ㄉ*ㄏㄨㄚ ㄊ*ㄏㄨㄚ | ㄉㄊ | ㄏㄏㄉㄊ |
| 8 | 黑河 | ㄏㄟㄏㄜ | ㄏㄏ | ㄏ*ㄏㄟ ㄕㄟ*ㄏㄜ | ㄏㄕ | ㄏㄏㄏㄕ |
| 9 | 黑話 | ㄏㄟㄏㄨㄚ | ㄏㄏ | ㄏ*ㄏㄟ ㄧㄢ*ㄏㄨㄚ | ㄏㄧ | ㄏㄏㄏㄧ |
| 10 | 歡呼 | ㄏㄨㄢㄏㄨ | ㄏㄏ | ㄧㄢ*ㄏㄨㄢ ㄎ*ㄏㄨ | ㄧㄎ | ㄏㄏㄧㄎ |
| 11 | 呼喊 | ㄏㄨㄏㄢ | ㄏㄏ | ㄎ*ㄏㄨ ㄎ*ㄏㄢ | ㄎㄎ | ㄏㄏㄎㄎ |
| 12 | 呼嚎 | ㄏㄨㄏㄠ | ㄏㄏ | ㄎ*ㄏㄨ ㄎ*ㄏㄠ | ㄎㄎ | ㄏㄏ<br>ㄎㄎㄎ |
| 13 | 呼喝 | ㄏㄨㄏㄛ | ㄏㄏ | ㄎ*ㄏㄨ ㄎ*ㄏㄛ | ㄎㄎ | ㄏㄏ<br>ㄎㄎㄎㄎ |
| 14 | 嘿嘿 | ㄏㄟㄏㄟ | ㄏㄏ | ㄎ*ㄏㄟ ㄎ*ㄏㄟ | ㄎㄎ | ㄏㄏㄎ<br>ㄎㄎㄎㄎ |
| 15 | 回火 | ㄏㄨㄟ ㄏㄨㄛ | ㄏㄏ | ㄨ*ㄏㄨㄟ ㄏ*ㄏㄨㄛ | ㄨㄏ | ㄏㄏㄨㄏ |
| 16 | 呼喚 | ㄏㄨㄏㄨㄢ | ㄏㄏ | ㄎ*ㄏㄨ ㄎ*ㄏㄨㄢ | ㄎㄎ | ㄏㄏㄎㄎㄎ<br>ㄎㄎㄎ |
| 17 | 好好 | ㄏㄠㄏㄠ | ㄏㄏ | ㄋ*ㄏㄠ ㄋ*ㄏㄠ | ㄋㄋ | ㄏㄏㄋㄋ |
| 18 | 棄邪歸正 | ㄑ ㄧㄒㄧㄒ<br>ㄍㄨㄟ ㄓㄥ | ㄑㄒㄍㄓ | Omitted as it is not necessary | n/n | ㄑㄒㄍㄓ |
| 19 | 奇形怪狀 | ㄑ ㄧㄒㄧㄣ<br>ㄍㄨㄞㄓㄨㄤ | ㄑㄒㄍㄓ | Omitted as it is not necessary | ㄓ | ㄑㄒㄍㄓㄓ |
| 20 | 欺君罔上 | ㄑ ㄧㄐㄩㄣ<br>ㄨㄤㄕㄤ | ㄑㄐㄨㄕ | Omitted as it is not necessary | n/n | ㄑㄐㄨㄕ |
| 21 | 起居無時 | ㄑ ㄧㄐㄩ<br>ㄨ ㄕ | ㄑㄐㄨㄕ | Omitted as it is not necessary | ㄕ | ㄑㄐㄨㄕㄕ |

FIG 11

Chart Showing The Process Through Which A Unique Set of Codes For A Phraese in Chinese Characters Used By The Japanese Is Created

| Row No. | Column No.1 | Column No. 2 | Column No. 3 | Column No. 4 | Column No. 5 | Column No. 6 |
|---|---|---|---|---|---|---|
| 1 | Phrases in Chiese Chrarcters and spelling in Kana | Spelling in Latin alphabets, *Hiragana* and *Katakana* | Acronyms according to various ways of spelling | Spelling according to the Process Discussed in Provisional Patent Application No. | Add Labels/ markers to the Acronym -s in column 3 | New, Unique Set of Codes for the phrases |
| 2 | 四角 | shi kaku | SK | koku-shi tsuno-kaku | kt | SKkt |
| | Hiragan | しかく | しか | くに*し つの*かく | くつ | しかくつ |
| | Katakana | シ カク | シカ | コク*シ ツノ*カク | クツ | シカクツ |
| 3 | 死角 | shi kaku | SK | ichi-ta-shi tsuno-kaku | it | SKit |
| | Hiragana | し かく | しか | いちた*し つの*かく | いつ | しかいつ |
| | Katakana | シ カク | シカ | カリ*シ ツノ*カク | カ ツ | シカクツ |
| 4 | 資格 | shi kaku | SK | kai-shi ki-kaku | kk | SKkk |
| | Hiragana | し かく | しか | かい*し き*かく | かき | しかかき |
| | Katakana | シカク | シカ | パイ*シ キ*カク | パキ | シカパキ |
| 5 | 生涯 | sho gai | SG | sei-sho sui-gai | ss | SGss |
| | Hiragana | しょう かい | しか | せい*しょう すい*かい | せす | しかせす |
| | Katakana | ショウ カイ | シカ | セイ*ショウ スイ*カイ | セス | シカセス |
| 6 | 傷害 | sho gai | SG | shin-sho ben-gai | sb | SGsb |
| | Hiragana | しょう がい | しか | しん*しょう べん*がい | しべ | しかしべ |
| | Katakana | ショウ カイ | シカ | シン*ショウ ベン*カイ | シベ | シカシベ |
| 7 | 障害 | sho gai | SG | fu-sho ben-gai | fb | SGfb |
| | Hiragana | しょう かい | しか | ふ*しょう べ*かい | ふべ | しかふべ |
| | Katakana | ショウ カイ | シカ | フ*ショウ ベン*カイ | フベ | シカフベ |

Note: The dark, italic letters in clumns 5 and 6 are repeatedly typed as markers.

FIG 12

Chart Showing The Process Through Which A Unique Set of Codes For A Phraese in Chinese Characters Used By The Koreans Is Created

| Row No. | Column No. 1 | Column No. 2 | Column No. 3 | Column No. 4 | Column No. 5 | Column No. 6 |
|---|---|---|---|---|---|---|
| 1 | Phrases in Chiese Chrarcters | Spelling in *Hangul* and Latin System | Acronyms according to *Pinyin* System | Spelling according to the Process Discussed in Provisional Patent Application No. | Add Labels/ markers to the Acronyms in column 3 | New, Unique Set of Codes for the phrases |
| 2 | 神氣 Latin | sin ki | SK | si-sin ki-ki | sk | SKsk |
| | Hangul | 신 기 | ㅅㄱ | 시*신 기*기 | ㅅㄱ | ㅅㄱㅅㄱ |
| 3 | 神奇 Latin | sin ki | SK | si-sin dae-ki | sd | SKsd |
| | Hangul | 신 기 | ㅅㄱ | 시*신 대*기 | ㅅㄷ | ㅅㄱㅅㄷ |
| 4 | 神技 Latin | sin ki | SK | si-sin su-ki | ss | SKss |
| | Hangul | 신 기 | ㅅㄱ | 시*신 수*기 | ㅅㅅ | ㅅㄱㅅㅅ |
| 5 | 神祇 Latin | sin ki | SK | si-sin si-ki | ss*s* | SKss*s* |
| | Hangul | 신 기 | ㅅㄱ | 시*신 시*기 | ㅅㅅㅅ | ㅅㄱㅅㅅㅅ |
| 6 | 神機 Latin | sin ki | SK | si-sin mok-ki | sm | SKsm |
| | Hangul | 신 기 | ㅅㄱ | 시*신 목*기 | ㅅㅁ | ㅅㄱㅅㅁ |
| 7 | 新奇 | sin ki | SK | kin-sin dae-ki | kd | SKkd |
| | Hangul | 신 기 | ㅅㄱ | 근*신 대*기 | ㄱㄷ | ㅅㄱㄱㄷ |

Note: The bold, italic letters in clumns 5 and 6 are the last letters repeatedly typed as markers.

FIG 13

Chart: Description of methods to illustrate the radicals

| Radical and its meaning | Methods of illustration | Radical and its meaning | Methods of illustration | Radical and its meaning | Methods of illustration |
|---|---|---|---|---|---|
| 土 Earth | Brown | 水 Water | blue droplets | 毛 Hair | Dark brown, picture of hair on a mold |
| 目 Eye | picture of eye | 金 Gold, metal | yellow gold bars | 皮 fur | picture of various animal skin with appropriate colors |
| 木 Tree, wood | green | 穴 cavern | Pictures of caverns | 日 Sun | sand |
| 心 Heart | red, picture of hearts | 血 blood | red droplets drip-ping from a wound | 人 people | picture of man, woman and child |
| 貝 Shell | Picture of various shells | 巾 Towel | off white, picture of towel | 食 food | picture of rice and bread |
| 石 Rock | picture of white grey rocks | 骨 Bone | bone white, picture of bones | 鼓 Drum | picture of drum with real life color |
| 谷 Valley | picture of valley | 竹 Bamboo | picture of green bamboo | 足 Foot | flesh color picture of foot |
| 首 Head | Picture of some heads of man, woman and some animals in their natural color | 手 Hand | pictur of hand in its natural color | 月 Moon | Picture of a new moon with its natural color |
| 身 Body (Not corpse) | Pictures of human bodies | 蟲 Insect | Picures of various insects in their natural colors | 艸 Grass | grass with light green color |
| 山 Mountain | Picture of mountains | 川 River | Picture of rivers | 髟 Hiar of the head | Picture of vasrious human hairdo |
| 車 Car | Picture of a car | 口 Mouth | picut re of a mouth | 馬 Horse | Picture of a horese |
| 矢 Arrowhead | Picture of an arrowhead | 十 Ten | Picture of ten fingers | 夕 night/evening | Picture of night sky |
| 大 Big or large | picture of 3 sets of different objects with a large and a small one in each set. Each of the 3 large ones will be circled. | 网 Net | Picture of a net | 小 Small | picture of 3 sets of different objects with a large and a small one in each set. Each of the 3 small ones will be circled. |
| 鬼 Ghost | Picture of a ghost | 士 Scolar | Picture of a scholar | 耳 Ear | Picture of an ear |
| 羽 Feather | Picture of various feathers | 雨 Rain | picture of rain | 玉 Jade | Picture of stones partially polished parts in green |
| 魚 Fish | Pictures of fish | 鳥 fowl, bird | Pictures of birds | 女 Female | Picture of girls and women |
| 工 Labor | Picture show people laboring | 弓 Bow | Picture of a bow | 角 Horn | Picture of a horn |
| 八 Eight | picture of 8 toes | 田 Field | Picture of rice field | 面 Face | Picture of a face |
| 米 Rice (uncooked) | picture of uncooked rice | 糸 Thread | picture of colorful threads | 羊 Gaot | Picture of a goat |

FIG 14

METHOD FOR CONVERTING NON-PHONETIC CHARACTERS INTO SURROGATE WORDS FOR INPUTTING INTO A COMPUTER

BACKGROUND OF THE PRESENT INVENTION

The present invention relates to written non-phonetic characters of oriental languages, such as Chinese, Japanese, Korean language, Indian language, and etc., and more particularly to a conversion method of creating new surrogate words to precisely represent such non-phonetic characters used in written oriental languages, in which the surrogate words are words created with either English-style or native alphabets in the present invention to represent non-phonetic characters used in the Chinese, Japanese and Korean languages. Therefore, the non-phonetic characters can be easily inputted into in a computer through an English-style or native alphabetic keyboard, a mouse or other phonetic inputting method. Moreover, such new surrogate words can be stored in a computer and precisely transmitted by E-mail (Electronic Mail).

Non-phonetic characters of Chinese languages were derived from pictures by the ancient Chinese to express themselves thousands of years ago. These characters have gone through many changes over their long history, from pictures of the subjects they described in the ancient times to the uniformly square shapes of today. The Koreans and the Japanese adopted and incorporated the Chinese characters into their languages, although they do not necessarily pronounce or use all the characters the same way as the Chinese do. The majority of the characters used by these two peoples have the same or similar meaning as they do in the Chinese language. Nowadays, most of the characters are consisted of two parts, i.e. one denotes the meaning, usually referred to as the pictogram when this part resembles something, or referred to as the ideogram when this part bears some of the meaning of the character. The other denotes the pronunciation, usually referred to as phonetic radical. In Chinese language, the pronunciation of a character is monosyllabic, meaning one sound for each character.

The ideogram is a symbol that can be either a character or part of a character, which denotes the meaning of that character by inference. Pare ideograms are rare. However they can be found in many characters that do not have phonetic radicals but instead, have two or more pictograms combined to infer a meaning that can be understood by the readers. The pronunciation of this kind of characters must be memorized, since there are no phonetic radicals present in this kind of characters. When the ideogram is used as a radical of a character, it is silent. The following are some examples of the ideogram.

(1) 明 is made of the sun, 日, and the moon, 月, therefore it means bright. (2) 艷 is consisted of abundant, 豐 and color, 色, therefore it means strikingly beautiful. (3) 好 is the combination of a son, 子 and a daughter, 女, hence it means good. (4) 細 is made of combination of silk, 絲 and small squares of rice field, 田, therefore it means tiny and fine. (5) 林 is made of two trees, 木, therefore it means woods.

The pictogram is a symbol that is either a character or part of a character, which is the approximate likeness of an object the character described. The pictograms are more common than the ideograms since the Chinese characters evolved from pictures. When the pictogram is used as a part of a character, it is silent. For example, 鳥 for bird, 馬 for horse, and 木 for wood or tree.

A pictogram not only bears the meaning of the character of which it is a part but also expresses the meaning by showing the physical likeness of the object the character described. This affords the character to be easily recognized and understood.

The radical is a part of a character. There are usually two kinds of radicals in a character. One denotes the meaning and the other denotes the pronunciation of the character. The former is known as a pictogram or ideogram depending on its shape or what it stands for. If the shape resembles an object, it is called pictogram. If it does not resemble anything but has a meaning derived from other uses, or from inference, it is called ideogram. They remain silent when the character is pronounced. Another kind of radical is known as a phonetic radical that bears the actual or approximate pronunciation of the character, hence it is sounded.

Sometimes, a character can be used as a radical, such as (1) 家 in 嫁,稼. (2) 飄 in 飄,漂,嫖. This kind of radicals are mostly used as phonetic radicals. Very often, a radical can be used as a character, such as 女,子,木.

Another unique feature in colloquial Chinese language is that it allows four ways to pronounce a given phonetic, i.e. four intonations. The total combinations of pronunciations and intonations in Chinese language are about 1,544. This compares to about 13,200 commonly used characters. Theoretically speaking, each pronunciation/intonation combination represents about 8 to 9 characters. In reality, a lot of pronunciation/intonation combinations are not adequately used or not used at all. Furthermore, the Chinese people seem to over-use some of the combinations, such as ji, qi and xi. Such uneven usage causes certain combinations to represent more than 50 characters. The applicant calls this phenomenon over representation, a problem that renders oriental languages (including Chinese, Japanese, Korean, and Indian languages) very difficult to be computerized in their original forms.

For example, there are 99 Chinese characters, such as 飢,几,蹟,貶,革,給, 擊,圾,基,機,濟 , 畸,稽,積,箕,肌,饑, 跡,激,雞,姬,績,急, 及,疾,籍,羈,棘, etc., having the same pronunciation/intonation combination of ji. There are 69 Chinese characters, such as 稽,緝,期,欺,棲 戚 妻 七,柒,沏,其 棋,奇,歧,畦,崎,臍 齊,旗,祈,祁,騎,起 豈 乞,企 etc., having the same pronunciation/intonation combination of qi. There are 67 Chinese characters, such as 係,繫,鼷,犧,昔 熙,析,西,矽,晰,嘻 吸,錫,稀,息,希,硒 etc., having the same pronunciation/intonation combination of xi.

Currently, the oriental languages, such as Chinese, Japanese, Korean language, and Indian language, use thousands of characters which is in contract to the English language's 26 alphabets, therefore the computerization of such oriental languages is a substantial problem. Obviously, it is absolutely impractical to have a typewriter keyboard consisting of thousands of keys. Thus, the input of the oriental characters into the computers or word processors becomes an extremely hard task.

Generally speaking, there are two major systems of computer inputting method for the oriental languages, i.e. the "shape" system and the "phonetic" system. The "shape" system, such as the "CHANGJEI" or "DA YI" input system for Chinese, designates a plurality of shape symbols according to the shapes of the radicals of the characters, in which each combination of the shape symbols represents an unique characters. The drawback of the "shape" system is really difficult to learn and use. The users have to study the specific way of how to divide each character into predetermined shape symbols and learn by heart thousands of shape symbols representing different characters. Although the shape system enables the user to precisely input the specific character into the computer or word processor, only a tiny portion of skilled people such as the professional typists who received special, and intensive training can utilize such "shape" system. Ordinary people are unable to input even one character by utilizing the "shape" system. Besides, the learning process of the "shape" system is so complicated that most business people are unable to spend so much time to learn by heart all the input codes of the "shape" system. In other words, the "shape" system is designed for those people whose career are computer data typists only. Furthermore, the "shape" system inputs and stores each character by 2 bites. However, during electronic transmission, such as E-mail, the transmitting unit is single byte only, so that any information or data inputted by the "shape" system is unable to E-mail through Internet. In other words, those oriental people whose written language is not a phonetic one such as English have little or no chance to enjoy the convenience of E-mail and Internet.

The "phonetic" system, such as the "PIN YIN" or "ZHUYIN" input system for Chinese, as shown in FIG. 1, enables the user to input the pronunciation of the character by typing the corresponding Latin-style alphabets adopted to represent consonants and vowels in Chinese or zhuyin zimu into the computer, therefore most people can utilize these methods without any training. Basically, pin yin is the Chinese pronunciation for spelling. Here the term implies "spelling with Latin-style alphabets". The pin yin system generally refers to the Draft Plan of Chinese Language Phonetic Spelling announced by the Committee for Chinese Characters Reform in February of 1956. These alphabets are listed alongside the zhuyin zimu in FIG. 1. The zhuyin zimu comprises thirty-six Chinese characters, with very few strokes each, which were chosen to represent consonants and vowels in Chinese language by the Chinese Ministry of Education in the spring of 1913. Zhuyin zimu is still commonly used in Taiwan for the purpose of teaching the pronunciation of the Chinese characters. In mainland China, however, the pin yin system has replaced zhuyin zimu. Please refer to FIGS. 1 and 4.

As mentioned above, for oriental languages, it is very common that a plurality of different characters have the same pronunciation. In other words, one single set of pin yin or zhuyin zimu codes may represent a plurality of different characters. Therefore, after a set of pin yin or zhuyin zimu codes is keyed-in, either the "PIN YIN" or the "ZHUYIN ZIMU" system will provide numerous characters for the user to select the exact character therefrom. For example, the pin yin of "及" is "ji". Therefore, if the user would like to key-in a character "及" which means "and", the user can key-in the alphabets j and i. However, there are approximately 99 Chinese characters, such as飢, 几, 蹟, 給, 擊, 圾, 汲, 基, 機, 譏, 畸, 稽, 積, 箕, 肌, 饑, 跡, 激, 雞, 姬, 績, 急, 及, 疾, 藉, 緝, 棘, etc., sharing the identical pronunciation/intonation combination of ji. The user needs to further search for the precise character 及 from the 99 homonymous characters appeared on the computer screen. Obviously, both the "PIN YIN" and "ZHUYIN" systems are too cumbersome and impractical. Moreover, for the reason mentioned above, neither the "PIN YIN" system nor the "ZHUYIN" system is adapted for transmission through E-mail.

Nowadays, the most efficient and commonly used tool for information transmission is the E-mail. Large quantity of data and information can be transmitted all over the world instantly. People can transmit or achieve unlimited information and knowledge instantly through the E-mail. However, those countries and people using oriental languages still can not discover any input method which is adapted to be E-mail. This unsolved situation may deeply resist the cultural and commercial development between the Asia and the Western societies.

Moreover, having been around for thousands of years, the Chinese culture produced huge numbers of idioms and proverbs that are quoted daily by hundreds of millions of people throughout East Asia and other places where Chinese, Japanese and Korean languages are taught or used. It will be a boon to the computer users who routinely process one of these languages to have a fast yet accurate means to input these frequently quoted phrases and sentences into the computers.

Those existing methods to input commonly used phrases and sentences written in Chinese or Kanji characters consists the following steps:

(1) Alphabetizing the Chinese or Kanji characters according to their pronunciation in the respective language, and (2) Typing the first alphabet of the spelling of each Chinese or Kanji character of the phrase to form an acronym on the keyboard of a computer which is equipped with a software that can interpret the acronyms and display the correspondent Chinese characters.

This method works fine when the pronunciation of a phrase is unique, but in real life, there are large number of phrases, especially the ones containing less than four characters, having identical pronunciation (homonymous). To compensate this problem of large number of homonyms, the software engineers design their program to display the phrases in Chinese characters, at the bottom of the screen for the typist to select the one he or she desires. If the desired phrase or sentence is not there, the typist can hit the down arrow key to invoke the next phrase or sentence until the desired one is found. This searching or selection process makes the existing method cumbersome, time consuming and, sometimes frustrating.

Accordingly, the learning and memorizing of the Chinese or Kanji characters is so ineffective that even an average student at 4th grade in China or Taiwan cannot express himself or herself clearly in Chinese characters. This has been largely blamed on the 'complexity' of the Chinese characters, and the public have been accepting this theory for over a thousand years. The situation can only be improved dramatically with a visual, audio or multimedia tool to expedite the learning process and consolidate what has already been learnt.

SUMMARY OF THE PRESENT INVENTION

The main object of the present invention is to provide a method for specifically converting non-phonetic characters representing vocabulary in languages into surrogate words for inputting into a computer. Such newly created surrogate words are unique for and can precisely represent the non-phonetic characters used in the written oriental languages such as Chinese, Japanese, Korean language, and Indian language, thus facilitating the easy input of the information in these languages into a computer.

Another object of the present invention is to provide a method for specifically converting non-phonetic characters representing vocabulary in languages into surrogate words for inputting into a computer, in which such newly created surrogate words are adapted to be transmitted through E-mail without losing any information.

Another object of the present invention is to provide a method for specifically converting non-phonetic characters representing vocabulary in languages into surrogate words for inputting into a computer, which paves the way for incorporating the voice recognizing and generating technology into computers processing information in the oriental languages.

Another object of the present invention is to provide a method for specifically converting non-phonetic characters representing vocabulary in languages into surrogate words for inputting into a computer, wherein a voice recognizing computer can be built using a sound card and a software as in usual manner to train it to understand a person's pronunciation of each word in such a manner that first the prefix, then the indicator if applies, then the separating mark (hyphen), then the suffix, then the marker(s) if applicable. Of course, the reversed combination described above can also be used for this purpose as long as the hyphen or * is pronounced first, then the suffix, then the hyphen or *, then the prefix. Therefore, the user can input an article into a computer by voice.

Another object of the present invention is to provide a method for specifically converting non-phonetic characters representing vocabulary in languages into surrogate words for inputting into a compute which is equipped with a voice generating system having a same sound card and a software that can pronounce the suffices of the surrogate words accurately, so that the computer can read out a document for the user to edit and print. Accordingly, the users need not spend time and effort to go over and check the document character by character for possible typing errors. This function can also help those people who can speak but cannot write or read the respective non-phonetic language to check their document which is inputted into the computer through the conversion method of the present invention.

Another object of the present invention is to provide a method for specifically converting non-phonetic characters representing vocabulary in languages into surrogate words for inputting into a computer. Such method enables both the Western and Eastern people to input oriental languages easily and precisely without any complicated learning process.

Another object of the present invention is to provide a method for specifically converting non-phonetic characters representing vocabulary in languages into surrogate words for inputting into a computer, which facilitates the input of the phrases and sentences into the computer.

Another object of the present invention is to provide a method for specifically converting non-phonetic characters representing vocabulary in languages into surrogate words for inputting into a computer, in which such method can also be utilized to teach speaking, reading and writing of a language whose written form is non-phonetic by using the theories and logic of the present invention.

Another object of the present invention is to provide a method for specifically converting non-phonetic characters representing vocabulary in languages into surrogate words for inputting into a computer, in which base on the converting method of the present invention, the using of the pictographic/ideographic radical as a prefix of the surrogate word can establish a helpful process for the children to memorize the Chinese or Kanji characters easily.

Accordingly, a method for specifically converting non-phonetic characters representing vocabulary in languages into surrogate words for inputting into a computer comprises the steps of:

(a) alphabetizing a pictographic/ideographic radical of each character according to its pronunciation in a respective language, with the resulting spelling then being used as a prefix for a newly created surrogate word;

(b) alphabetizing the character according to its pronunciation in the respective language, with the resulting spelling then being used as a spelled suffix for the newly created surrogate word; and (c) combining the prefix and suffix together to form a surrogate word for the specific "character" used in the written form of the respective language.

In order to distinguish the prefix and the suffix in a surrogate word to avoid any confusion to the user, the above step (c) further comprises a distinction step of separating the prefix and the suffix with a separating mark, such as a hyphen "-" or a space inserting between the prefix and the suffix of the surrogate word.

With respect to the Chinese language which has intonations, for the new surrogate words in Chinese, the intonations of the pronunciation of the prefixes and suffixes are indicated with selected consonants as indicators.

For pictograms/ideograms with the same pronunciation and intonation, the last alphabet of the spelling for the specific pictogram/ideogram is repeated either once, twice or thrice, the repeated alphabets being treated just as extra alphabets for distinguishing the radicals they represent and have no bearing on the pronunciation of the radicals.

When the new surrogate words are pronounced, the prefixes are to be treated like the pictograms or ideograms that they represent silent. Just as the phonetic radicals they represent, the suffixes are sounded. If the pronunciation of a Chinese prefix is unique, the indicator for its intonation is exempted. Since the suffixes are sounded, the demand for accuracy dictates that the indicator for the intonations should be present at all times with suffixes except when the intonation is the first one of four.

BRIEF DESCRIPTION OF THE DRAWINGS

FIG. 1 is a chart for illustrating the Pin Yin alphabets and Zhuyin Zimu.

FIG. 2 is a chart for illustrating the Katakana, Hiragana and their English Equivalent.

FIG. 3 is a chart for illustrating the Hangul and their English Equivalent.

FIGS. 4-1 to 4-11 are a continuous chart for illustrating the 214 p/i radicals of Chinese language and the spelled surrogate prefix for each p/i radical, in which various systems of surrogate prefix can be obtained by Literary pronunciation, Habitual pronunciation, simplified special key(s) (both pinyin alphabets and zhuyin zimu) for computer input, and some simplified optional key for computer input.

FIG. 5 is a chart for illustrating a plurality of Chinese characters having the identical pronunciation of ji, wherein each character is precisely represented by a unique surrogate word achieved by the three steps of the conversion method of the present invention.

FIG. 6 is a chart for illustrating the five steps used to convert the Chinese characters into surrogate words in English-style alphabets and Zhuyin Zimu according to the present invention.

FIG. 7 is a chart for illustrating the five steps used to convert the Japanese characters into surrogate words in English-style alphabets, Katakana and Hiragana according to the present invention.

FIG. 8 is a chart for illustrating the five steps used to convert the Korean characters into surrogate words in English-style alphabets and Hangul according to the present invention.

FIG. 9 is a chart for illustrating the changes made to the alphabets used in the Pin Yin system according to the present invention.

FIG. 10 is a chart for illustrating the steps used to convert the Chinese phrases into surrogate phrases in English-style alphabets according to the present invention.

FIG. 11 is a chart for illustrating the steps used to convert the Chinese phrases into surrogate phrases in Zhuyin Zimu according to the present invention.

FIG. 12 is a chart for illustrating the steps used to convert the phrases of the Chinese characters used by the Japanese phrases into surrogate phrases in English-style alphabets, Hiragana and Kataka according to the present invention.

FIG. 13 is a chart for illustrating the steps used to convert the phrases of Chinese characters used by the Korean phrases into surrogate phrases in English-style alphabets and Hangul according to the present invention.

FIG. 14 is a chart for introducing how the pictographic/ideographic radicals be illustrated visually.

DETAILED DESCRIPTION OF THE PREFERRED EMBODIMENT

The Chinese, the written form of Japanese and Korean languages which are derived from the Chinese, and even the Indian languages are constituted by non-phonetic characters. The present invention provides a method to convert such non-phonetic characters into phonetic components by using existing or newly created phonetic symbols. The phonetic symbols are the visual signs to represent the phonetic components, consonants and vowels. They can be Latin-style or English-style alphabets and native alphabets such as Zhuyin Zimu, Kataka, Hiragana, Hangul, and etc. Phonetic symbols can also be created by designating a set of signs to represent consonants, vowels and intonations of any languages.

The purpose of the conversion method of the present invention is to enable the computerization of these languages. The phonetic symbols can be English-style alphabets, native alphabets such as Zhuyin Zimu, Katakana, Hiragana, Hangul or newly created signs or symbols. Each non-phonetic character is then converted to a unique and newly spelled "surrogate word" by the conversion process disclosed in the present invention. The newly spelled surrogate words can precisely represent the characters used in the respective language. Please refer to FIGS. 1, 2 and 3 for these phonetic symbols and FIGS. 6, 7 and 8 for the spelled surrogate words constituted of these phonetic symbols. These three charts, as shown in FIGS. 6, 7 and 8, can be seen as a summary of this conversion process.

Generally speaking, each non-phonetic character, such as each typical Chinese character, is constituted by a pictographic or ideographic radical (reciting as "p/i radical" in the following description) denoting the meaning of the character and a phonetic radical denoting the pronunciation or the approximate pronunciation of the character. There are only 214 p/i radicals. Practically, the 214 p/i radicals can be coded precisely by 214 different sets of codes to represent the corresponding p/i radicals respectively. Referring to FIG. 4, in fact, each p/i radical has a specific pronunciation, for example, the Chinese character "西" pronouncing xi and "支" pronouncing zhi. In other words, surrogate words "xi" and "zhi" precisely represent the p/i radicals "西" and "支" respectively.

To assign thousands of sets of codes as surrogate words to precisely represent all the non-phonetic characters of an oriental language, for example Chinese, is more than possible. However, as the "shape" input system (such as the "CHANGJEI" or "DA YI" input system for Chinese mentioned in the background of the present invention) did, it is nearly impossible for a common and non-career user to memorize thousands of unfamiliar codes. In fact, before a human being learns how to write, he or she learns how to speak, i.e. how to pronounce the characters in a sentence. Hence, the pronunciation-derived alphabetization is one of the most familiar and logical ways to form a character. English utilizes different combinations of the 26 alphabets to constitute all the words in that language. Most Chinese characters also provide the phonetic radicals as their major constituting components.

No matter the Chinese, Japanese or Korean language, homonym is a common phenomenon in pronouncing characters and radicals. When two or more characters or radicals share identical pronunciation, or identical combination of pronunciation and intonation, they are said to be homonyms.

According to the present invention, a character is broken into two radicals. Then the radicals are alphabetized into prefix and suffix to form a surrogate word representing a given character. However, as disclosed in the background of the present invention, there are many non-phonetic characters are homonyms which share the identical pronunciation. The present invention provides a conversion method of creating new surrogate words to precisely represent such non-phonetic characters used in written oriental language respectively. Such conversion method can entirely solve such problems of homonyms, so that the non-phonetic characters can be easily inputted into in a computer through an ordinary alphabetic keyboard, a mouse or other phonetic inputting method by keying in sequentially the corresponding created surrogate words for the characters.

For Chinese language, the most common phonetic systems of pronunciation for spelling is Pinyin, Zhuyin Zimu, and Yueyin. Pinyin is the Chinese pronunciation for spelling. Here the term implies "spelling with Latin-style alphabets." Zhuyin comprises thirty-six Chinese characters, with very few stokes each. They were chosen to represent consonants and vowels in Chinese language, as shown in FIG. 1. Yueyin is the use of Pinyin for the Cantonese dialect.

For Japanese language, the most common phonetic system of pronunciation for spelling is Hiragana and Katakana, as shown in FIG. 2, in which Hiragana, which is treated as if it is plural in the present invention, is a group of special Chinese characters adopted by the Japanese as consonants and vowels to denote the pronunciation of vocabularies of Japanese origin. Hiragana resemble script Chinese characters. They are also a form of Japanese alphabets. Katakana, which is treated as if it is plural in the present invention, are a group of special Chinese characters adopted by the Japanese as consonants and vowels to denote the pronunciation of the Chinese characters and vocabularies of foreign origin. Katakana resemble the shapes of the printed characters. In reality, Katakana are also Japanese alphabets.

For Korean language, as shown in FIG. 3, Hangul are symbols representing the consonants and vowels of the Korean language. They are, in fact, referred to as alphabets by the Korean people.

The conversion method for specifically converting non-phonetic characters representing vocabulary in languages into surrogate words for inputting into a computer of the present invention comprises the steps as follows.

Step One.

Alphabetize a pictographic/ideographic radical of each character according to its pronunciation in a respective language, with the resulting spelling then being used as a prefix for a newly created surrogate word.

For example, if English-style alphabets is used, the following examples illustrate how to phoneticalize the p/i radicals of the characters by spelling according to their pronunciation respectively in Chinese, Japanese and Korean.

A. Chinese language: 1. mu for 木. 2. ma for 馬. 3. niao for 鳥 4. shui for 水. 5. xin for 心.

B. Japanese language: 1. ki for 木. 2. uma for 馬. 3. tori for 鳥. 4. sui or mizu for 水. 5. sakana or uo for 魚.

C. Korean language: 1. mool or soo for 水. 2. nahmooh or muk for 木. 3. kim for 金. 4. soon or soo for 手.

It is worth to mention again that, of course, the p/i radicals can be represented in many ways. One way is to assign a unique number to each p/i radical. The total 214 numbers for the 214 p/i radicals can then be used instead of the spelling. Another way is to use a combination of keys on a computer key board to represent the numbers assigned to the radicals. For an example, by pressing one or two or all three of Ctrl. Alt, and Shift, then press any one of the alphanumeric keys, we can easily have 214 key combinations to represent all 214 p/i radicals. But the applicant thinks that the phonetic representation is the most user-friendly of all methods because the majority of these radicals can be easily pronounced and spelled. It requires little or no effort to memorize numbers or keys.

Step Two.

Alphabetize a phonetic radical of each character according to its pronunciation in the respective language, or alphabetize a pronunciation of a character if this character does not have a phonetic radical or when the phonetic radical does not bear the actual pronunciation of its character. The resulting spelling is then used as a suffix for the newly created surrogate word.

For example, if English-style alphabets is used, the following examples illustrate how to phoneticalize the phonetic radicals of the characters by spelling according to their pronunciation respectively in Chinese, Japanese and Korean.

A. Chinese language: 1. ya for 牙 and 甲 as in 鴉 and 鴨, in which 牙 is the phonetic radical of the character 鴉 and 鴉 pronounces 牙 (i.e. ya). Also 甲 is the phonetic radical of the character 鴨 and 鴨 pronounces 甲 (i.e. ya). 2. mei for 美, 每, 眉, and 未 as in 妹. 3. qi for 奇 as in 騎.

B. Japanese language: 1. ken for 検 as in 検, 験, and 肙 as in 涓 and 鵑. 2. for 鶴 and 蔓. 3. kai for 皆 as in 楷, 圭 as in 鮭, 貴 as in 潰.

C. Korean language: 1. kang for 巷 as in 港, 工 as in 江 亢 as in 抗 and 岡 as in 鋼. 2. to for 兆 as in 桃 and 淘 as in 淘.

Step Three.

Combine the prefix and suffix together to create a newly spelled surrogate word for each specific "character" used in the written form of the respective language.

For inputting a surrogate word representing a non-phonetic character into a computer, an inputting tool bar is programmed to present on the screen of the computer. The inputting tool bar comprises two separated input windows, wherein one input window is a prefix inputting window for keying in the alphabetized spelling of the prefix of the surrogate word, and that another input window is a suffix inputting window for keying in the alphabetized spelling of the suffix of the surrogate word. By inputting the prefix and the suffix of the surrogate word into the prefix inputting window and the suffix inputting window respectively, the surrogate word is input into the computer for the representing character.

In order to distinguish the prefix and the suffix in a surrogate word to avoid any confusion to the user, the above step three further comprises a distinction step of separating the prefix and the suffix with a separating mark, such as a hyphen "-" or a space, which is inserted between the prefix and the suffix.

For example:

A. Chinese language:

1. mu-mei for 梅 which p/i radical is 木 pronouncing mu and phonetic radical is 每 pronouncing mei (the character 梅 also pronouncing mei).
2. niao-ya for 鴉 which p/i radical is 鳥 pronouncing niao and phonetic radical is 牙 pronouncing ya (the character 鴉 also pronouncing ya).
3. ma-qi for 騎 which p/i radical is 馬 pronouncing ma and phonetic radical is 奇 pronouncing qi (the character 騎 also pronouncing qi).

B. Japanese language: 1. ki-ken for 検. 2. uma-ken for 験. 3. sui-ken for 涓. 4. tori-ken for 鵑. 5. kusa-tsuru for 蔓. 6. tori-tsuru for 鶴. 7. ki-kai for 楷. 8. sakana-kai for 鮭. 9. sui-kai for 潰.

C. Korean language: 1. mool-kang for 江. 2. soo-kang for 抗. 3. kim-kang for 鋼. 4. nahmooh-to for 桃. 6. mool-to for 淘.

By processing the above step one to step three, a unique and newly spelled surrogate word is created to precisely represent a specific character. The surrogate word generally comprises a prefix and a suffix combining by a separating mark, in which the prefix is the spelling of the pronunciation of the phi radical of the character and the suffix is the spelling of the pronunciation of the phonetic radical of the character or the pronunciation of the character. When the user is spelling the surrogate word, it just likes the user is speaking the character. In other words, Chinese, Japanese or Korean people can simply and easily distinguish which surrogate word created by the above steps of the present invention is standing for which character, as if they are writing that character.

However, when the inputting specific character is a p/i radical itself, such as 衣 一，言，人，土，大，口，女，力 etc., the user can immediately achieve the above precise character after inputting the prefix (the spelling for the p/i radical) and the separating mark only and does not need to key in the suffix. In some case, even the separate mark can also be omitted.

In view of Chinese language, although the surrogate words do not look like the written Chinese character, it is 100% derived from Chinese character. According to the above three steps of the conversion process of the present invention, approximately 95% of the Chinese characters are precisely represented by a corresponding unique surrogate word respectively. In other words, when the user inputs a surrogate word created with the above three steps into a computer or word processor, a specific Chinese character can be precisely obtained. Therefore, this conversion method highly increases the inputting accuracy and speed of inputting Chinese characters. Furthermore, since the surrogate words are constituted of alphabets and can precisely represent the respective characters, the surrogate words enable the non-phonetic characters, i.e. the Chinese, Japanese and Korean languages, to be sent through E-mail without any confusion and loss of any information.

Generally, a number of Chinese characters have an identical pronunciation, for example the pronunciation yi has about 99 homonymous characters. It is the major problem making the non-phonetic characters difficult or even impossible to be computerized. As shown in FIG. 5, a list of Chinese homonym characters is illustrated, wherein all the characters pronounce ji. In accordance with the present invention, the spelling of the pronunciation ji of each homonymous character as shown in FIG. 5 is converted to be a suffix of a surrogate word. Since the non-phonetic characters have a common feature that there is no identical character, i.e. each character has a different appearance, this feature becomes an important distinct factor of the non-phonetic characters. Practically, even two characters have an identical pronunciation, they have different p/i radicals or even differently written phonetic radicals. In other words, even though they may have the same p/i radicals and are pronounced identically, they definitely have different shapes, so that they will not be misunderstood by a reader. By this point, one would probably has gathered that the non-phonetic characters are visually based. The trick to sort homonyms in a visually based written language is by making them look different from one another. Therefore, according to the present invention, the spelling of the pronunciation or an assigned alphabetic or number code of the p/i radical of each homonymous character is used as a prefix of the surrogate word. Combining the prefix and the suffix with a separating mark constitutes a whole spelled surrogate word uniquely representing that character. As shown in FIG. 5, each homonymous character has a corresponding, unique spelled surrogate word, therefore by inputting those surrogate words into the computer or word processor, a specific character can be obtained.

Basically, by proceeding the above three steps of the conversion method of the present invention, nearly all of but 5% of the Chinese and 10 to 15% of Japanese and Korean characters can be precisely inputted into a computer by typing the corresponding, unique surrogate words for the characters. Of course, the user may simply selects the desired character from the display on the screen of the computer since the large number of homonym characters is reduced to several characters only. The present invention already greatly shortens the selection time and reduces work. The present invention further provides two additional steps to the above three basic steps for creating unique surrogate words which can 100% precisely represent the remaining homonymous characters. In other words, by processing the total five steps of the present invention, there will be no chance of any two characters having an identical surrogate word.

With respect to the Chinese language which has intonations, for the new surrogate words in Chinese, the intonations of the pronunciation of the prefixes and suffixes are denoted with selected consonants as indicators. Therefore, a first additional step is processed before the step three as described above. In the first additional step, for the newly spelled surrogate words for Chinese characters, intonations of the pronunciation of the prefixes and suffixes are to be indicated with consonants placed at the end of the spelling. The first intonation bears no indicator. The second intonation is denoted by the second Chinese consonant "p" for pinyin alphabet and "ㄆ" for zhuyin zimu. The third intonation is denoted by a third consonant "m" for pinyin alphabet and "ㄇ" for zhuyin zimu The fourth intonation is denoted by a fourth consonant "f" for pinyin alphabet and "ㄈ" for zhuyin zimu.

For examples:

In Chinese language: 1. shi for 尸. 2. ship for 十. 3. shim for 矢. 4. shif for 示

Therefore, for example, for the Chinese character 湄, its unique surrogate word is shui-mei. In which its p/i radical is 水 pronouncing shui and phonetic radical is 眉 pronouncing mei (the character 湄 also pronouncing mei).

It is important to note that in the official colloquial Chinese language, Mandarin dialect, the consonants never appear behind the vowels except for n or r according to the rules set forth in the Pinyin system. Therefore it is easy for a reader or typist to recognize these three ending consonants p, m, f, as indicators of the intonations. It must be noted again that this first additional step does not apply to the Japanese and Korean languages as these languages do not have intonations in their colloquial form. Basically, by processing the above four steps, approximately 98% of the Chinese characters can be precisely represented by their corresponding specific surrogate words respectively.

Since the Chinese language has quite a few pictograms or ideograms with the same pronunciation and intonation, , there are some extreme examples as shown in FIG. 6, in which four homonymous Chinese characters having the identical pronunciation of shi are illustrated. A second additional step is processed after step three. In the second additional step, a marker is added after the last alphabet of the surrogate word to represent the next homonymous pictogram or ideogram that appears secondly in the Index of Pictograms/Ideograms in a Chinese dictionary. The marker can be any key on the keyboard. However, for the sake of efficiency and accuracy, this marker should be the last alphabet of the spelling. In other words, the repetition of the last alphabet of the spelling distinguishes homonymous pictograms or ideograms. For the homonymous pictogram or ideogram that appears secondly in the Index (choose bar) on the screen of the computer or in the standard dictionary, it will be repeated once, twice for the one that appears thirdly, thrice for the one that appears fourthly in the Index (choose bar) on the screen of the computer or in the standard dictionary. However, we can used the numerals 1, 2, 3, 4, 5, . . . or "home keys": a, s, d, f, g, h, j, k, l, and etc. or any other predetermined symbols as the markers. Home keys are the keys provided on the keyboard of the computer where the typist's fingers generally rest thereon for representing the numerals 1 to 10.

For example:

A. Chinese language: 1. y for 一. 2. yy for 乙. 3. yyy for 弋. 4. yyyy for 衣. OR "1" for 一. 2. "2 " for 乙. 3. "3" for 弋. 4. "4" for 衣. OR "a" for 一. 2. "s" for 乙. 3. "d" for 弋. 4. "f" for 衣.

B. Japanese language: 1. ki for 木; 2.kii for 黄.

C. Korean language: 1. sin for 城 2. sinn for 身 3. sinnn for 辛 4. sinnnn for 辰

The repeated alphabets shall be treated just as extra alphabets, or markers, for distinguishing the homonymous radicals and they shall not have any bearing in the pronunciation of the radical. The same procedure mentioned above will be applied to the homonymous characters having the identical prefix according to the order they appear in the dictionaries.

Example as shown in FIGS. 6 to 8:

A. Chinese language (as shown in FIG. 6): 1. yan-shif for 試. 2. yan-shiff for 誓. 3. yan-shifff for 諟. 4. yan-shiffff for 識. OR 1. yan-shi1 for 試 2.yan-shi2for 誓. 3.yan-shi3for 諟. 4.yan-shi4for 識. OR (1. yan-shia for 試. 2. yan-shis for 誓. 3. yan-shid for 諟. 4. yan-shif for 識.)

B. Japanese language (as shown in FIG. 7): 1. ki-ko for 杠. 2. ki-koo for 杞. 3. ki-kooo for 杭. 4. ki-koooo for 枯.

C. Korean language (as shown in FIG. 8): 1. muk-ki for 杞. 2. muk-kii for 枝. 3. muk-kiii for 棋. 4. muk-kiiii for 機.

When the new surrogate words are pronounced, the prefixes are to be treated like the pictograms or ideograms that they represent silent. Just as the phonetic radicals they represent, the suffixes are sounded. If the pronunciation of a Chinese prefix is unique, the indicator for its intonation is exempted. Since the suffixes are sounded, the demand for accuracy dictates that the indicator for the intonations to be present at all times with suffixes except when the intonation is the first one of the four.

Please refer to FIGS. 6 to 8, which summarize the entire conversion process for four extreme exemplary characters which can illustrate all five steps regarding to the present invention. FIG. 6 illustrates four Chinese characters as example. FIG. 7 illustrates four Japanese characters as example. FIG. 8 illustrates four Korean characters as example. Those charts in FIGS. 6 to 8 share the same format that each has five columns and at least eight rows. Starting from the left, Column 1 contains the five steps of the conversion process or description of the columns to the right. The four columns to the right contains the four characters mentioned in the above examples, one in each column, and the transformation they go through row by row. Row 1 is occupied by the four characters in their original forms with pronunciation marked by English-style alphabets. Row 2 houses the radicals derived from each character. Row 3 shows the spelling for each and every radical. This row actually details the effects of steps one and two. Row 4 illustrates the effect of step three, which applies only to the Chinese language. Row 5 shows how step four influences the characters, with explanation in column two. Row 6 demonstrates how step five completes the conversion process with comments in each column invoking rule number two. Row 7 exhibits the final products of the process by themselves without any description. By doing so, it allows the readers to clearly see the uniqueness of the newly spelled surrogate words or codes for the characters which share the identical prefix, pronunciation and intonation. Row 8 unveils the surrogate words experimentally spelled with native alphabets. There is an extra row in FIG. 7, because the Japanese people have 2 sets of native alphabets, i.e. Katakana and Hiragana. Row 8 is occupied by codes made of Katakana. Codes made of Hiragana are put in row 9. There is also an extra row in FIG. 8 too. The applicant just wants to use that extra row to spell codes in Hangul organized in a straight horizontal line like English. At the bottom of each chart, a rule which is described below is listed for reminding purpose.

In accordance with the present invention, the conversion method further has two rules for pronouncing the invented surrogate words.

1. When it comes to pronouncing the invented, spelled surrogate words, the prefixes are to be silent (like the pictograms or ideograms they represent). Just as the phonetic radicals they stand for, the suffices are sounded.
2. If the pronunciation of a prefix is unique, the indicator for its intonation can be omitted. Since the suffices are sounded, the demand for accuracy dictates that the indicator for their intonation to be present at all times except when the intonation is the first one of the four.

As described in the above step three of the present invention, the surrogate words are organized in such a manner: the prefix comes in first, then the separating mark (the separating mark can be a hyphen as in Latin alphabets, however the hyphen can be replaced by other symbols such as * if native alphabets are used to spell the surrogate words), then the suffix. However, the step one and the step three as described above can be reversed, that is, the suffix proceeds the prefix. Therefore, the surrogate word will be organized "suffix-prefix". Such alternative mode will also work as long as the computer is told this is the situation. For example, the unique surrogate word of the specific Chinese character 績 is "ji-xi" according to this second embodiment (in the first embodiment, the surrogate word of 績 is "xi-ji"). Since both the surrogate words created from the first embodiment and the second embodiment consist of the same alphabets, both of them can be used to precisely represent the same character. Besides, the user may preprogram the computer with a "switching key", so that the user can feel free to switch the computer to accommodate the first and the second embodiment anytime.

In fact, the second embodiment may be better in certain cases. When a particular user feels that the pictographic/ideographic radical is hard to pronounce, hence difficult to type. Instead of looking from the dictionary for the pronunciation of a rare and difficult radical, the user can just go ahead to type the suffix. The computer can display homonymous characters for the user to choose. This can be done, for example, by typing just a hyphen or * in case of native alphabet, first, then the suffix. If the user suddenly remembers the spelling of the prefix, i.e. the spelling of the pronunciation of the p/i radical, he can type a hyphen (or *, if native alphabets are used) then the prefix. He can still get precisely the character he desires, since this reversed combination is just as unique as the "normal" combination described in step four of the first embodiment. Otherwise, homonymous characters will be displayed for the user to select the desired character. Instead of numeralizing the homonyms, alphabets of the "home keys" can be used to indicate the order of the homonyms. The user can choose the desired character by typing in a key, such as: "a" for the first, "s" for the second, "d" for the third". This is just a matter of the software design.

Moreover, the combination of these five steps, including the reversed combination described above, and the two rules not only enables the Chinese, Japanese, Korean, and even East Indians to use computers likes Americans, but also makes voice recognizing/generating technology readily available to them. A voice recognizing computer can be built using a sound card and a software as in usual manner to train it to understand a person's pronunciation of each word in such a sequence that first the prefix, then the indicator if applies, then the marker if applies, then the separating mark (hyphen or asterisk), then the suffix, then the indicator if applies, then the marker(s) if applicable. Of course, the reversed combination described above can also be used for this purpose as long as the hyphen or asterisk (*) is pronounced first, then the suffix, then the hyphen or asterisk (*), then the prefix.

The conversion method disclosed in the present invention can enable those people who can speak but cannot write the respective non-phonetic language to input the characters into a computer and print out an essay written in that language. Another remarkable function of the present invention is that by utilizing a voice generating computer, with the same sound card and a software that can pronounce the suffices accurately, the computer can read out a document for the user to edit and print, so that the users need not spend time and energy to go over and check the document character by character for possible typing errors. This function can also help those people who can speak but cannot write or read the respective non-phonetic language to check their document which is inputted into the computer through the conversion method of the present invention.

The following are some notes that the applicant would like to further disclose.

The English-style alphabets used to create the surrogate words to precisely represent the characters in written Chinese language are the ones used in the official Pinyin system in China, with some minor changes. These changes are intended to eliminate some exceptions in the Pinyin system, making it easier to use. Please referring to FIG. 1 for the entire set of Pinyin alphabets and FIG. 9 for the said changes. If Zhuyin Zimu is used to spell the newly invented surrogate words, the prefixes and the suffixes should be separated by an asterisk instead of a hyphen.

The alphabets used to create the surrogate words to precisely represent the characters in written Japanese are the ones proposed in Hepburn system of romanization commonly accepted by the Japanese to phonetically translate the Japanese language into English-style alphabets. If the new surrogate words are spelled with Takina or Hiragana, the hyphen should be replaced by an asterisk also.

The alphabets used to create the surrogate words to precisely represent the characters used in the written Korean language are the ones commonly accepted by the Koreans to phonetically translate the Korean language into English-style alphabets. Also, an asterisk is used instead of a hyphen when the native alphabet is employed to spell a surrogate word for a character used in Korean language.

To distinguish the surrogate words invented for these languages from English, the non English spellings can be italicized as is the case in this application.

The order of the Chinese consonants are as follows according to the Pinyin system: B, P, M, F, D, T, L, N, G, K, H, J, Q, X, ZH, CH, SH, R, Z, C, S.

It is possible to abbreviate the prefixes after the mass gets very familiar with them. In its abbreviated form, the consonant, the first alphabet or the last alphabet of a prefix should be adequate to represent most of the prefixes. With voice recognition technology, the abbreviation may not be necessary.

In this description, the examples of the phonetically spelled surrogate words with native alphabets for the Chinese, Japanese and Korean languages are illustrations of the concept of the present invention. The actual spellings for the same characters with the native alphabets or English-style alphabets may differ from the ones used in this description. Furthermore, one can always create any kinds of signs to replace the existing phonetic symbols. But to effectively create uniquely new surrogate words to precisely represent the characters, one has to use the five steps and the two rules disclosed in the present invention.

The newly spelled surrogate words, whether made of English-style or the native alphabets, resemble the characters in the way both kinds are consisted of radicals, pictographic or ideographic ones and phonetic ones. These surrogate words differ from the characters in at least two ways. First, the radicals for the newly spelled surrogate words are phoneticalized, while the radicals in the characters, especially the pictographic/ideographic radicals are not. Second, the invented and spelled surrogate words are more uniform in construction that the pictographic/ideographic radicals always occupy the left portion of the surrogate words as prefixes, and the phonetic radicals always occupy the right portion of the surrogate words as suffixes. While the pictographic/ideographic radicals in the characters can occupy the left right, top or bottom portion of the characters. The aforesaid resemblance makes the new surrogate words more familiar to the users while the differences make the new surrogate words logical and more scientific from the stand point of phonology. As a result, it is fairly easy to learn these surrogate words. Practically, the user can simply type the surrogate word which represents a specific non-phonetic character through the key board so as to precisely key-in the specific non-phonetic character into the computer.

According to the conversion method for converting non-phonetic characters into surrogate words of the present invention, the user can simply input the predetermined character into the computer by means of a manually inputting method processed after executing the conversion method.

The manually inputting method comprises the steps of:

(1) typing the prefix of the surrogate word created by the conversion method;

(2) typing the indicator, if applicable, of the prefix;

(3) typing the marker, if applicable, of the prefix;

(4) typing the separating mark, if applicable, of the surrogate word;

(5) typing the suffix of the surrogate word;

(6) typing the indicator, if applicable, of the suffix; and (7) typing the marker, if applicable, of the suffix.

In addition, the user can also simply input the predetermined character into the computer, which is equipped with a voice recognizing system, by means of an orally inputting method processed after executing the conversion method as disclosed above. The orally inputting method comprises the steps of:

(1) pronouncing the prefix of the surrogate word created by the conversion method;

(2) pronouncing the marker, if applicable, of the prefix;

(3) pronouncing the separating mark of the surrogate word;

(4) pronouncing the suffix of the surrogate word;

(5) pronouncing the marker, if applicable, of the suffix.

Referring to FIGS. 10 to 13, by means of the surrogate words, it renders a set of multi-syllabic vocabularies, a phrase or a sentence of written Chinese or Kanji characters used in Chinese, Japanese and Korean languages to be keyed-in through a simplified method utilizing a surrogate phrase or sentence which is a unique set of codes (USC).

The unique set of codes (USC) is a group of alphabets constitute of acronyms, labels and makers for precisely representing a phrase or sentence, in which the acronym refers to the abbreviation of the suffixes of a plurality of surrogate words representing a plurality of Chinese characters in a given phrase or sentence and the label refers to the abbreviation of the prefixes of a plurality of surrogate words representing a plurality of Chinese characters in the above given phrase or sentence. Besides, the marker is the repetition or repetitions of the last alphabet of the acronym or label.

The unique surrogate phrase or sentence constituted of a plurality of non-phonetic characters can be achieved by the following steps:

(a) alphabetizing each non-phonetic character of the phrase according to a pronunciation of the non-phonetic character to form a spelled prefix for a surrogate word of the non-phonetic character, and (b) selecting a first or a last alphabet from each prefix of each non-phonetic character of the phrase and grouping the selected alphabets of each prefix of each non-phonetic character of the phrase to form an acronym of the surrogate phrase.

Generally, the non-phonetic character is pronounced with a pronunciation of a phonetic radical of the non-phonetic character. For most Chinese phrases or sentences which have more than four characters, the specific phrase or sentence may be achieved by merely keying-in the acronym, which is obtained by the above two steps, of the surrogate phrase or sentence into the computer. If there are still a few homonymous phrases or sentences occurred, an additional step of repeating the last alphabet of the acronym as a marker can be processed.

For phrases or sentences with four Chinese characters or more, simply repetition of the last alphabet of the acronym as the marker can be adequate to separate the homonymous acronyms from one another since the homonymous acronyms of longer phrases or sentences are less common than those of the phrases consisting less than four characters.

For those phrases with less than four Chinese characters, additional steps as follows must be processed:

(c) alphabetizing a pictographic/ideographic radical of each non-phonetic character of the phrase according to a pronunciation of the pictographic/ideographic radical of the non phonetic character or an abbreviation of the pronunciation of the pictographic/ideographic radical to form a spelled suffix of the non-phonetic character;

(d) grouping a first or a last alphabet of the suffix of each non-phonetic character to form a label of the surrogate phrase; and (e) combining the acronym and the label together to form the unique surrogate phrase, as shown in the column 6 of FIGS. 10 to 13.

By inputting the surrogate phrase into the computer, generally the precise phrase or sentence in characters can be achieved. However, in order to prevent misunderstanding of the acronym and the label of the surrogate phrase, the acronym can be keyed in upper case alphabets and the label can be keyed in lower case alphabets if the acronym and label are pronounced by English-style alphabets according to the Pinyin system. Of course, one can also key-in the acronym in lower case alphabets and the label in upper case alphabets.

If such surrogate phrase is still unable to produce a unique set of codes to represent the specific phrase or sentence, the following step can be processed until a unique set of codes (USC) is created:

(f) repeating the last alphabet of the label as a marker.

Basically, the acronym and the label can also be pronounced by Zhuyin Zimu, Hiragana, Katagana or Hangul. In accordance with the present embodiment, the acronym is keyed-in before the label. It is also possible to put the label in front of the acronym, then repeat the last alphabet of the acronym as a marker.

Alternatively, the above step (e) can be substituted by the step (e') of putting each alphabet of the label ahead of each alphabet of the acronym, or the step (e") of putting each alphabet of acronym ahead of each alphabet of the label. For example, if we have an acronym "ABCDE" and a label "stuvw" instead of forming a surrogate phrase as "ABCDEstuvw" or "STUVWabcde" as mentioned above, the alternative surrogate phrase can be created in this manner: "SaThUcVdWe" or "AsBtCulDvEw".

With a software based on this invention, all commonly used phrases in Chinese, Japanese and Korean languages can be produced precisely on the screen just a English words are processed now. For newly created popular phrases or sentences, the typist can create the new unique surrogate phrases for them respectively. Moreover, using a conventional voice recognizing software which helps the computer to understand the pronunciation of the alphabets, the surrogate phrases can be input orally. After the computer is informed that phrase input will begin, the user can then start reading the unique set of codes (surrogate phrase), including cases of the alphabets, to input the phrases. The computer can then convert the voice into Chinese characters.

It is worth to mention that there are other modified methods to create orders of acronyms mentioned above. These can be based on any alphabet of the prefixes or suffixes of any character of the phrases or sentences. Here are some examples:

1. In the native alphabetical order of:

A. The first alphabet of prefix of the first Chinese character of the phrase or sentence; or B. The last alphabet of the prefix of the first Chinese character of the phrase or sentence; or C. The first alphabet of the prefix of the last Chinese character of the phrase or sentence; or D. The last alphabet of the prefix of the last Chinese character of the phrase or sentence; or E. The last alphabet of the suffix of the first Chinese character of the phrase or sentence; or F. The last alphabet of the suffix of the last Chinese character of the phrase of sentence.

2. English alphabetical order for all of the above and the acronyms mentioned above can be used as well when Latin-style alphabets are used to create USC's.

3. The order can be based on the number of strokes of one of the radicals contained in any character or the number of strokes of any character of the phrase or sentence, for examples, number of strokes of the following can be used for this purpose:

A. The first Chinese or Kanji character of the phrase or sentence: or

B. The last Chinese of character of the phrase or sentence; or

C. The pictographic/ideographic radical of the first character of the phrase or sentence; or D. The pictographic/ideographic radical of the last character of the phrase or sentence: or E. The phonetic radical of the first Chinese character of the phrase or sentence; or F. The phonetic radical of the last Chinese character of the phrase or sentence.

Besides, actually the label can be any alphabet of a prefix or suffix of any character of the phrase, for examples, one of the following can be used as a label:

A. The first alphabet of the prefix of the first character of the phrase or sentence;

B. The last alphabet of the prefix of the first character of the phrase or sentence;

C. The first alphabet of the suffix of the first character of the phrase or sentence;

D. The last alphabet of the suffix of the first character of the phrase or sentence;

E. The first alphabet of the prefix of the last character of the phrase or sentence;

F. The last alphabet of the prefix of the last character of the phrase or sentence;

G. The first alphabet of the suffix of the last character of the phrase or sentence;

H. The last alphabet of the suffix of the last character of the phrase of sentence.

Also, the label can be the number of strokes of any character or its one of its radicals in the phrase or sentence.

The preferable labels are made of the regular form of the first alphabet of the prefixes because it is flowing with the typist's train of thoughts. Also, the labels will always be in lower case alphabet, while the acronyms themselves are always in upper case alphabet. This arrangement can avoid confusion on the part of the human as well as the computer. Since the spelling of a character is always in lower case alphabet the "shift" key on the keyboard will serve as a signal to the computer that the user is going to input a phrase or sentence.

In fact, the theory of the surrogate phrase can be applied to any language that is burdened by homonyms, such as certain dialects in Indian language.

Again, the predetermined phrase or sentence of non-phonetic characters can also be input into the computer by means of by means of a manually inputting method processed after executing the conversion method for converting a plurality of non-phonetic characters of a phrase of a language into a surrogate phrase as described above.

The manually inputting method comprises the steps of:

(1) typing the surrogate phrase or sentence created by the conversion method; and (2) typing the marker, if applicable, of the surrogate phrase or sentence.

Also, if the computer is equipped with a voice recognizing system, the user can also simply input the predetermined phrase or sentence into the computer by means of an orally inputting method processed after executing the conversion method as disclosed above. The orally inputting method comprises the steps of:

(1) pronouncing the surrogate phrase or sentence created by the conversion method alphabet by alphabet including the cases of the alphabets if applicable; and (2) pronouncing the marker, if applicable, of the surrogate phrase or sentence.

These surrogate words and surrogate phrases (unique sets of codes (USC)) can be used to send documents consisting Chinese characters through E-mail via the Internet or other similar media, as long as the receiving party has a copy of the same software installed that can interpret the surrogate words and USC's. In fact, the documents generated without the benefit of the surrogate words and USC's are not quite compatible with the Internet protocol since the characters require two bytes to represent each and every one of them while Internet recognizes only one byte (actually seven bits) at a time. That is due to the extraordinarily large number of Chinese characters, one byte is not adequate to represent all of them, since the largest number of byte can represent is 256, which is large enough to cover all of the English alphabets, punctuation marks and numbers. To accommodate thousands of the Chinese characters, two bytes are required to make up a number which will have more than four digits. This conflict puts this kind of documents at odds with the Internet protocol. A document with this incompatibility can get "scrambled" beyond recognition after going through the Internet. However, if the contents of these documents are sent through E-mail in the form of the surrogate words or surrogate phrases (USC), they will arrive their destination intact, because the Internet protocol will treat the surrogate words and phrases as English which is totally compatible with Internet.

Base on the method for converting non-phonetic characters into surrogate words as disclosed above, the using of the pictographic/ideographic radical as a prefix of the surrogate word can establish a helpful process for the children to memorize the Chinese or Kanji characters easily. Since every character has a pictographic/ideographic radical or is solely constituted by a pictographic or ideographic radical (many pictographic/ideographic radical itself is a character), the pictographic/ideographic radicals play a very important part of memorizing a character. Once one recognizes a pictographic/ideographic radical of a character, one can understand the meaning or the shape of the character. It is an important feature and characteristic of Chinese or Kanji characters. Moreover, a visual image is the most easy thing to be memorized.

In other words, every pictographic/ideographic radical can be illustrated by a visual drawing which is more easily and familiarly for the user to memorize. For example, as shown in FIG. 14, 目, pronouncing "mu" and having a meaning of the phonetic word, "eye", can be illustrated by a picture of eye; 木 pronouncing "mu" and having a meaning of the phonetic word, "wood", can be illustrated by a drawing of a green tree; 身, pronouncing "shen" and having a meaning of the phonetic word, "body", can be illustrated by a drawing of a human body; 骨, pronouncing "gu" and having a meaning of the phonetic word, "bone", can be illustrated by a picture of bone.

Accordingly, since each pictographic/ideographic radical has a unique meaning, the spelling of the meaning of each pictographic/ideographic radical can also be used as the alphabetized spelling of the prefix of the surrogate word. For example, the "eye" for 目, "wood" for 木, "body" for 身, and "bone" for 骨. Therefore, for example, the surrogate words for Chinese characters:

眠 (meaning "sleep") is "eye-mian"; 根 (meaning "root") is "wood-gen"; 躺 (meaning "lie down") is "body-tang"; and 髀 (meaning "thighbone") is "bone-bi".

Alternatively, it is possible to designate and program 214 different pictorial and colorful icons into the computer representing the 214 radicals respectively, therefore the user may use the mouse of the computer to precisely click on the desired icon for inputting the prefix of the surrogate word.

Those designated pictorial icons have an additional function of helping the user or student to memorize the pictographic/ideographic radicals. In order to remind the spelling of the pictographic/ideographic radicals for the user, the spelling of the pronunciation of each pictographic/ideographic radical can further be illustrated next to the representing pictorial icon.

Therefore, a memorizing process can be added to the basic steps of the conversion method described above, which comprises the steps of:

(a) assigning a unique code to represent a pictographic/ideographic radical of a non-phonetic character of a language, wherein the unique code being used as a prefix for a surrogate word;

(b) alphabetizing the non-phonetic character of the respective language according to a pronunciation of the non-phonetic character to form a spelled suffix for the surrogate word; and (c) combining the prefix and the suffix together to constitute the surrogate word representing the non-phonetic character of the respective language.

The memorizing process comprises the following steps adding after the above step (c):

(d1) illustrating the prefix of the surrogate word by a visual picture which represents the meaning of the pictographic/ideographic radical represented by the prefix;

(d2) illustrating the meaning of the non-phonetic by a corresponding meaning visual picture;

(d3) combining the prefix visual picture with the character meaning visual picture.

Practically, we can use animated visual aids such as video tapes to describe how the visual pictures transformed into certain Chinese characters, then pictograms and color code them. The same can be done to explain how the ideograms were derived. This can firmly imprint the p/i radicals in the minds of the students.

Once the students understand each p/i radical, then characters under each p/i radical can be shown in this manner:

1. Video will be used to show the actions the verbs describe.

2. Still pictures will be used to show the objects the nouns describe. We will use '火' huo (fire) as an example.

First, a video shows a group of people sitting around an orange-red colored bond fire. Then a close-up of the bond fire will be shown. The video will then show the flames of the fire roaring to make a noise mimicking the pronunciation of 'huo,' and dancing to form the shape of the character '火' bearing the same orange-red color. A video showing how a calligrapher smoothes out the fussy edges of the picture, and gives it the modern look as '火' bearing the same color. Then we will show how the right half of the character is shrunk so that the character can be used as a pictographic radical in the same orange-red color.

Video showing a woman stir-flying food in a wok on top of an orange-red colored fire, making noise with the iron spatula mimicking 'chao' can be shown together with the character '炒' (Pronounced chao in Chinese) with its pictographic radical '火' in orange-red color. Other characters such as 煎, 炸·蒸·烤 can be made in the same manner, leaving the p/i radical in orange-red color.

For those radicals that cannot be effectively represented by colors alone, the strokes of the radicals of this type can be made 'hollow,' that is, to outline the stroke with black ink but leave the rest blank. Then tiny, but visually discernible colored pictures of the objects the radicals represent can be used to fill in the blank space. Of course, these pictures will have to be the still pictures that are used to explain the radicals. For an example, 骨 gu (bone) can be shown with just the outline filled with tiny pictures of bones. A partial list of the radicals and the method to illustrate them is shown in FIG. 1. This list is intended to show what can be done to made the radicals easy to recognize and to remember.

The remaining radicals can be illustrated the same way, if they are related to tangible objects. There are some radicals that are related to intangible concepts. These intangible radicals can be outlined to have "blank space" in the strokes first. The its pronunciation in native alphabets can be put in the blank space.

In the drawing, there is a column referred to as "method of illustration." In that column, the word "picture" are meant to be the "tiny, but visually discernible colored pictures" mentioned above in this paragraph. In that column, a specific color is mentioned most of the time. When the color is not mentioned, a natural color of the object relative to the radical will be used.

Although the above examples are all in Chinese pronunciation, they can obviously be applied any other languages, such as Japanese and Korean languages. All it takes is to substitute Chinese pronunciation with the pronunciation of chosen language, for example, Japanese or Korean.

What is claimed is:

1. A method for converting non-phonetic characters into surrogate words for inputting into a computer, comprising the steps of:

(a) assigning a unique code to represent a pictographic/ideographic radical of a non-phonetic character of a language, wherein said unique code being used as a prefix for a surrogate word;

(b) alphabetizing said non-phonetic character of said respective language according to a pronunciation of said non-phonetic character to form a spelled suffix for said surrogate word; and (c) combining said prefix and said suffix together to constitute said surrogate word representing said non-phonetic character of said respective language.

2. A method for converting non-phonetic characters into surrogate words for inputting into a computer, as recited in claim 1, wherein, in step (a), said unique code of said prefix of said surrogate word is a numeral code.

3. A method for converting non-phonetic characters into surrogate words for inputting into a computer, as recited in claim 1, wherein, in step (a), said unique code of said prefix of said surrogate word is an alphabetic spelling of a phonetic word having a meaning of said pictographic/ideographic radical.

4. A method for converting non-phonetic characters into surrogate words for inputting into a computer, as recited in claim 1, wherein, in step (a), said unique code of said prefix of said surrogate word is an alphabetic spelling of a pronunciation of said pictographic/ideographic radical.

5. A method for converting non-phonetic characters into surrogate words for inputting into a computer, as recited in claim 1, wherein, in step (a), said unique code of said prefix of said surrogate word is an abbreviated form of an alphabetic spelling of a pronunciation of said pictographic/ideographic radical.

6. A method for converting non-phonetic characters into surrogate words for inputting into a computer, as recited in claim 5, wherein said abbreviated form of said prefix of said surrogate word is a consonant of said pronunciation of said pictographic/ideographic radical.

7. A method for converting non-phonetic characters into surrogate words for inputting into a computer, as recited in claim 5, wherein said abbreviated form of said prefix of said surrogate word is a first alphabet of said alphabetic spelling of said pronunciation of said pictographic/ideographic radical.

8. A method for converting non-phonetic characters into surrogate words for inputting into a computer, as recited in claim 5, wherein said abbreviated form of said prefix of said surrogate word is a last alphabet of said alphabetic spelling of said pronunciation of said pictographic/ideographic radical.

9. A method for converting non-phonetic characters into surrogate words for inputting into a computer, as recited in claim 1, wherein, in step (b), said character of said respective language is alphabetized by pronouncing a phonetic radical of said character to form said suffix of said surrogate word.

10. A method for converting non-phonetic characters into surrogate words for inputting into a computer, as recited in claim 1, wherein, in step (c), further comprising a first additional step of indicating an intonation of said suffix with a predetermined consonant as an indicator placed at the end of said spelling of said suffix.

11. A method for converting non-phonetic characters into surrogate words for inputting into a computer, as recited in claim 4, wherein, in step (c), further comprising a first additional step of indicating an intonation of said prefix and said suffix respectively with a predetermined consonant as an indicator placed at the end of said spelling of said prefix and said suffix.

12. A method for converting non-phonetic characters into surrogate words for inputting into a computer, as recited in claim 11, wherein a first intonation of said prefix and said suffix bear no indicator, a second intonation of said prefix and said suffix being denoted by a second consonant, a third intonation of said prefix and said suffix being denoted by a third consonant, a fourth intonation of said prefix and said suffix being denoted by a fourth consonant.

13. A method for converting non-phonetic characters into surrogate words for inputting into a computer, as recited in claim 1, after said step (c), further comprising an additional step of adding at least a marker after a last alphabet of prefix and a last alphabet of said suffix of said spelled surrogate word respectively for distinguishing homonymous characters.

14. A method for converting non-phonetic characters into surrogate words for inputting into a computer, as recited in claim 12, after said step (c), further comprising an additional step of adding at least a marker after a last alphabet of prefix and a last alphabet of said suffix of said spelled surrogate word respectively for distinguishing homonymous characters.

15. A method for converting non-phonetic characters into surrogate words for inputting into a computer, as recited in claim 1, wherein, after step (c), further comprising the steps of:

(d1) illustrating the prefix of the surrogate word by a visual picture which represents the meaning of the pictographic/ideographic radical represented by the prefix;

(d2) illustrating the meaning of the non-phonetic by a corresponding meaning visual picture; and (d3) combining the prefix visual picture with the character meaning visual picture.

16. A method for converting non-phonetic characters into surrogate words for inputting into a computer, as recited in claim 1, wherein each of said surrogate words is input into the computer by inputting a spelling of said prefix and then a spelling of said suffix into the computer.

17. A method for converting non-phonetic characters into surrogate words for inputting into a computer, as recited in claim 1, after step (c), further comprising an inputting method for inputting said non-phonetic character into said computer by typing surrogate word into said computer.

18. A method for converting non-phonetic characters into surrogate words for inputting into a computer, as recited in claim 17, wherein said inputting method comprises the steps of: (1) typing said prefix of said surrogate word into said computer; and (2) typing said suffix of said surrogate word into said computer.

19. A method for converting non-phonetic characters into surrogate words for inputting into a computer, as recited in claim 1, after step (c), further comprising an inputting method for inputting said non-phonetic character into said computer by pronouncing said surrogate word into a voice recognizing system of said computer.

20. A method for converting non-phonetic characters into surrogate words for inputting into a computer, as recited in claim 19, wherein said inputting method comprises the steps of: (1) pronouncing said prefix of said surrogate word into a voice recognizing system of said computer; and (2) pronouncing said suffix of said surrogate word into said voice recognizing system of said computer.

21. A method for converting non-phonetic characters into surrogate words for inputting into a computer, comprising the steps of:

(a) alphabetizing a non-phonetic character of a language according to a pronunciation of said non-phonetic character to form a spelled prefix of a surrogate word;

(b) assigning a unique code to represent a pictographic/ideographic radical of said non-phonetic character of said respective language, wherein said unique code being used as a suffix for said surrogate word; and (c) combining said prefix and said suffix together to constitute said surrogate word representing said character of said respective language.

22. A method for converting non-phonetic characters into surrogate words for inputting into a computer, as recited in claim 21, wherein, in step (a), said unique code of said prefix of said surrogate word is a numeral code.

23. A method for converting non-phonetic characters into surrogate words for inputting into a computer, as recited in claim 21, wherein, in step (a), said unique code of said prefix of said surrogate word is an alphabetic spelling of a phonetic word having a meaning of said pictographic/ideographic radical.

24. A method for converting non-phonetic characters into surrogate words for inputting into a computer, as recited in claim 21, wherein, in step (a), said unique code of said prefix of said surrogate word is an alphabetic spelling of a pronunciation of said pictographic/ideographic radical.

25. A method for converting non-phonetic characters into surrogate words for inputting into a computer, as recited in claim 21, wherein, in step (a), said unique code of said prefix of said surrogate word is an abbreviated form of an alphabetic spelling of a pronunciation of said pictographic/ideographic radical.

26. A method for converting non-phonetic characters into surrogate words for inputting into a computer, as recited in claim 25, wherein said abbreviated form of said prefix of said surrogate word is a consonant of said pronunciation of said pictographic/ideographic radical.

27. A method for converting non-phonetic characters into surrogate words for inputting into a computer, as recited in claim 25, wherein said abbreviated form of said prefix of said surrogate word is a first alphabet of said alphabetic spelling of said pronunciation of said pictographic/ideographic radical.

28. A method for converting non-phonetic characters into surrogate words for inputting into a computer, as recited in claim 25, wherein said abbreviated form of said prefix of said surrogate word is a last alphabet of said alphabetic spelling of said pronunciation of said pictographic/ideographic radical.

29. A method for converting non-phonetic characters into surrogate words for inputting into a computer, as recited in claim 21, wherein, in step (b), said character of said respective language is alphabetized by pronouncing a phonetic radical of said character to form said suffix of said surrogate word.

30. A method for converting non-phonetic characters into surrogate words for inputting into a computer, as recited in claim 21, wherein, in step (c), further comprising a first additional step of indicating an intonation of said suffix with a predetermined consonant as an indicator placed at the end of said spelling of said suffix.

31. A method for converting non-phonetic characters into surrogate words for inputting into a computer, as recited in claim 24, wherein, in step (c), further comprising a first additional step of indicating an intonation of said prefix and said suffix respectively with a predetermined consonant as an indicator placed at the end of said spelling of said prefix and said suffix.

32. A method for converting non-phonetic characters into surrogate words for inputting into a computer, as recited in claim 31, wherein a first intonation of said prefix and said suffix bear no indicator, a second intonation of said prefix and said suffix being denoted by a second consonant, a third intonation of said prefix and said suffix being denoted by a third consonant, a fourth intonation of said prefix and said suffix being denoted by a fourth consonant.

33. A method for converting non-phonetic characters into surrogate words for inputting into a computer, as recited in claim 21, after said step (c), further comprising an additional step of adding at least a marker after a last alphabet of prefix and a last alphabet of said suffix of said spelled surrogate word respectively for distinguishing homonymous characters.

34. A method for converting non-phonetic characters into surrogate words for inputting into a computer, as recited in claim 32, after said step (c), further comprising an additional step of adding at least a marker after a last alphabet of prefix and a last alphabet of said suffix of said spelled surrogate word respectively for distinguishing homonymous characters.

35. A method for converting non-phonetic characters into surrogate words for inputting into a computer, as recited in claim 21, wherein, after step (c), further comprising the steps of:

(d1) illustrating the prefix of the surrogate word by a visual picture which represents the meaning of the pictographic/ideographic radical represented by the prefix;

(d2) illustrating the meaning of the non-phonetic by a corresponding meaning visual picture; and (d3) combining the prefix visual picture with the character meaning visual picture.

36. A method for converting non-phonetic characters into surrogate words for inputting into a computer, as recited in claim 21, wherein each of said surrogate words is input into the computer by inputting a spelling of said prefix and then a spelling of said suffix into the computer.

37. A method for converting non-phonetic characters into surrogate words for inputting into a computer, as recited in claim 21, after step (c), further comprising an inputting method for inputting said non-phonetic character into said computer by typing surrogate word into said computer.

38. A method for converting non-phonetic characters into surrogate words for inputting into a computer, as recited in claim 37, wherein said inputting method comprises the steps of: (1) typing said prefix of said surrogate word into said computer; and (2) typing said suffix of said surrogate word into said computer.

39. A method for converting non-phonetic characters into surrogate words for inputting into a computer, as recited in claim 21, after step (c), further comprising an inputting method for inputting said non-phonetic character into said computer by pronouncing said surrogate word into a voice recognizing system of said computer.

40. A method for converting non-phonetic characters into surrogate words for inputting into a computer, as recited in claim 39, wherein said inputting method comprises the steps of: (1) pronouncing said prefix of said surrogate word into a voice recognizing system of said computer; and (2) pronouncing said suffix of said surrogate word into said voice recognizing system of said computer.

* * * * *